(12) United States Patent
Shin

(10) Patent No.: US 9,380,262 B2
(45) Date of Patent: Jun. 28, 2016

(54) MOBILE TERMINAL AND METHOD FOR OPERATING SAME

(71) Applicant: LG ELECTRONICS INC., Seoul (KR)

(72) Inventor: Ju Yeon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/764,930

(22) PCT Filed: Sep. 9, 2013

(86) PCT No.: PCT/KR2013/008131
§ 371 (c)(1),
(2) Date: Jul. 30, 2015

(87) PCT Pub. No.: WO2014/119835
PCT Pub. Date: Aug. 7, 2014

(65) Prior Publication Data
US 2015/0358579 A1 Dec. 10, 2015

(30) Foreign Application Priority Data
Jan. 31, 2013 (KR) .......................... 10-2013-0011278

(51) Int. Cl.
| H04N 7/14 | (2006.01) |
|---|---|
| H04N 5/232 | (2006.01) |
| H04R 1/40 | (2006.01) |
| H04R 3/00 | (2006.01) |
| H04S 7/00 | (2006.01) |
| H04R 5/027 | (2006.01) |

(52) U.S. Cl.
CPC ............ *H04N 7/142* (2013.01); *H04N 5/23219* (2013.01); *H04N 5/23296* (2013.01); *H04R 1/406* (2013.01); *H04R 3/005* (2013.01); *H04S 7/303* (2013.01); *H04N 7/141* (2013.01); *H04N 2007/145* (2013.01); *H04R 5/027* (2013.01); *H04R 2430/20* (2013.01); *H04R 2499/11* (2013.01); *H04S 2400/15* (2013.01)

(58) Field of Classification Search
USPC ...................................................... 348/14.16
See application file for complete search history.

(56) References Cited

U.S. PATENT DOCUMENTS

| 2011/0232989 A1 | 9/2011 | Lee et al. |
|---|---|---|
| 2011/0246187 A1 | 10/2011 | Srinivasan et al. |

FOREIGN PATENT DOCUMENTS

| KR | 10-2006-0038001 A | 5/2006 |
|---|---|---|
| KR | 10-2011-0100652 A | 9/2011 |
| KR | 10-2011-0102466 A | 9/2011 |

*Primary Examiner* — Creighton Smith
(74) *Attorney, Agent, or Firm* — Birch, Stewart, Kolasch & Birch, LLP

(57) ABSTRACT

The present invention relates to a mobile terminal, and a method for operating the same. According to an embodiment of the present invention, a method for operating a mobile terminal includes the steps of: forming an audio beam based on at least one of a photographed image from a camera and motion information from a motion sensor; receiving an audio signal from a speaker through a plurality of microphones; and processing the received audio signal based on the formed audio beam. Thus, the use convenience is improved.

18 Claims, 32 Drawing Sheets

MOBILE TERMINAL AND METHOD FOR OPERATING SAME

CROSS REFERENCE TO RELATED APPLICATIONS

This application is the National Phase of PCT International Application No. PCT/KR2013/008131, filed on Sep. 9, 2013, which claims priority under 35 U.S.C. 119(a) to Patent Application No. 10-2013-0011278, filed in Republic of Korea on Jan. 31, 2013, all of which are hereby expressly incorporated by reference into the present application.

TECHNICAL FIELD

Embodiments of the present invention relates to a mobile terminal and an operating method thereof, and more particularly, to a mobile terminal and an operating method thereof, for enhancing user convenience.

BACKGROUND ART

A mobile terminal s a portable device with one or more of a function of voice call and video call, a function of inputting and outputting information, and a function of storing data. As the mobile terminal is diversified in function, the mobile terminal gets more complex functions of image or video photography, reproduction of a music file or a video file, gaming, broadcast reception, wireless Internet, transmission of messages, and so on, and has been embodied in the form of an integrated multimedia player. With regard to a mobile terminal embodied in the form of a multimedia player, new attempts have been applied in terms of hardware or software in order to embody complex functions.

DISCLOSURE

Technical Problem

It is an aspect of the present invention to provide a mobile terminal and an operating method thereof, for enhancing user convenience.

It is another aspect of the present invention to provide a mobile terminal and an operating method thereof, for forming an audio beam to correspond to a position of a speaker so as to receive an optimum audio signal.

Technical Solution

In accordance with one aspect of the present invention, an operating method of a mobile terminal including a camera, a motion sensor, and a plurality of microphones includes forming an audio beam for collecting an audio signal from a speaker based on at least one of a photograph image from the camera and motion information from the motion sensor, receiving the audio signal from the speaker through the plurality of microphones, and signal-processing the received audio signal based on the formed audio beam.

In accordance with another aspect of the present invention, an operating method of a mobile terminal including a camera, a motion sensor, and a plurality of microphones includes entering an audio reception mode, activating the camera, the motion sensor, the plurality of microphones, forming an audio beam for collecting an audio signal from a speaker based on at least one of a photograph image from the camera and motion information from the motion sensor, and upon completely forming the audio beam, displaying an objecting indicating that the audio beam is completely formed.

In accordance with another aspect of the present invention, a mobile terminal includes a camera, a motion sensor for detecting motion information of the mobile terminal, a plurality of microphones for collecting an audio signal, and a beam processor for determining a position of a speaker based on at least one of a photograph image from the camera and motion information from the motion sensor, forming an audio beam for collecting an audio signal from the speaker to correspond to the position of the speaker, and signal-processing the audio signal received through the plurality of microphones based on the formed audio beam.

Advantageous Effects

According to an embodiment of the present invention, a mobile terminal may determine a position of a speaker based on at least one of a photograph image from a camera and motion information from a motion sensor, form an audio beam for collecting an audio signal from the speaker to correspond to the position of the speaker, receive an audio signal from the speaker through a plurality of microphones based on the formed audio beam, and process the audio signal so as to receive an optimum audio signal corresponding to the position of the speaker, thereby enhancing user convenience.

In particular, in an audio input mode, an audio beam may be completely formed to a position of a speaker's mouth in an image formed by photographing the speaker before the speaker moves his or her mouth so as to receive an optimum audio signal immediately after the speaker outputs an audio signal, thereby enhancing user convenience.

When a speaker moves, an audio beam for collecting an audio signal from the speaker may be updated based on a photograph image formed by photographing the moving speaker or the photograph image formed by photographing the moving speaker and the received audio signal so as to adaptively receive an optimum audio signal, thereby enhancing user convenience.

When a mobile terminal moves, an audio beam for collecting an audio signal from the speaker may be updated based on a photograph image formed by photographing the moving speaker and the received audio signal or the photograph image formed by photographing the moving speaker, motion information of the mobile terminal from the motion sensor, and the received audio signal so as to adaptively receive an optimum audio signal, thereby enhancing user convenience.

When there is a plurality of speakers with respect to the mobile terminal, a plurality of audio beams may be formed to correspond to respective positions of the speakers and an audio beam corresponding to a speaker who moves his or her mouth among the plurality of speakers may be activated so as to quickly and accurately receive an optimum audio signal, thereby enhancing user convenience.

When there is a plurality of speakers with respect to a mobile terminal, if an audio signal of another speaker other than the speaker is input, a second audio beam may be formed based on a photograph image from a camera and the audio signal from the another speaker and an audio signal may be received and signal-processed based on the second audio beam so as to adaptively receive an optimum audio signal, thereby enhancing user convenience.

BEST MODE

Reference will now be made in detail to exemplary embodiments of the present invention, examples of which are illustrated in the accompanying drawings.

In the specification, a mobile terminal includes a portable phone, a smart phone, a notebook computer, a digital broadcast terminal, a personal digital assistant (PDA), a portable multimedia player (PMP), a camera, a navigation device, a tablet computer, an e-book terminal, and so on. The suffixes "module" and "unit" of elements herein are used for convenience of description and do not have any distinguishable meanings or functions. Thus, the suffixes "module" and "unit" can be used interchangeably FIG. 1 is a diagram illustrating a case in which an audio receiver mode is executed in a mobile terminal according to the present invention.

Figure 1:
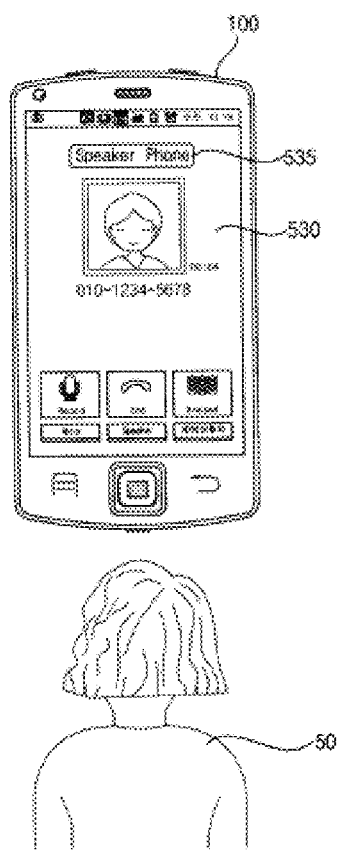
FIG. 1 is a diagram illustrating a case in which an audio receiver mode is executed in a mobile terminal according to the present invention.

FIG. 1 illustrates the case in which a mobile terminal 100 of FIG. 1 operates in a speaker mode of an audio receiver mode. In FIG. 1, a speaker mode image 530 according to the speaker mode, in particular, an object 535 indicating the speaker mode is displayed on the mobile terminal 100.

During the speaker mode, the mobile terminal 100 may activate a plurality of microphones installed therein. In this case, a speaker 50 may talk with another person while spacing the mobile terminal 100 apart from the speaker 50 with a predetermined distance, for example, while viewing a display of the mobile terminal 100, as illustrated in FIG. 1.

The mobile terminal 100 according to an embodiment of the present invention includes a camera 121 (refer to FIG. 2), a plurality of microphones 123 (refer to FIG. 2), and a motion sensor 145 (refer to FIG. 2) and forms an audio beam in order to receive an optimum audio signal during reception of an audio signal from a speaker in an audio receiver mode such as a speaker mode.

In particular, in order to form the audio beam, the mobile terminal 100 may determine a speaker position and form the audio beam corresponding to the speaker position, based on at least one of an image captured by photographing the speaker 50 using a camera 121 (refer to FIG. 2) and motion information from a motion sensor. Here, the speaker position may be positional information on x, y, and z axes or may be a relative speaker position based on a position of the mobile terminal 100.

That is, the positional information of a speaker may be interpreted as including angle information between the mobile terminal 100 and the speaker 50 based on distance information from the mobile terminal 100 and the speaker 50 or the mobile terminal 100.

In addition, the mobile terminal 100 may form an audio beam for optimum signal processing of an audio signal received by the plurality of microphones 123 (refer to FIG. 2), based on the positional information of the speaker.

For example, when the speaker 50 is positioned in front of the mobile terminal 100 so as to be perpendicular to the mobile terminal 100, an audio field around the mobile terminal 100 may be set with a magnitude that is highest at an angle (90 degrees) at which the speaker 50 is positioned and is gradually reduced at other angles.

As another example, when the speaker 50 is positioned to the right of, but not in front of, the mobile terminal 100, an audio field around the mobile terminal 100 may be set with a magnitude that is highest at an angle of approximately 105 degrees at which the speaker 50 is positioned and is gradually reduced at other angles based on approximately 105 degrees.

Before a speaker's mouth moves, the mobile terminal 100 may generate the audio beam, and when the speaker's mouth moves and an audio signal is received, the mobile terminal 100 may process the audio signal through the generated audio beam. Accordingly, the mobile terminal 100 may receive an optimum audio signal from a time point when the speaker 50 outputs voice. Accordingly, user convenience may be enhanced.

When a speaker moves, a mobile terminal moves, or there is a plurality of speakers, the mobile terminal 100 according to an embodiment of the present invention may form an audio beam based on a captured image from a camera, motion information of the mobile terminal from a motion sensor, and an audio signal received from a microphone so as to quickly and accurately receive an optimum audio signal. Accordingly, user convenience is enhanced.

Various methods for forming an audio beam in the mobile terminal 100 according to an embodiment of the present invention will be described in detail with reference to FIG. 5.

Figure 2:
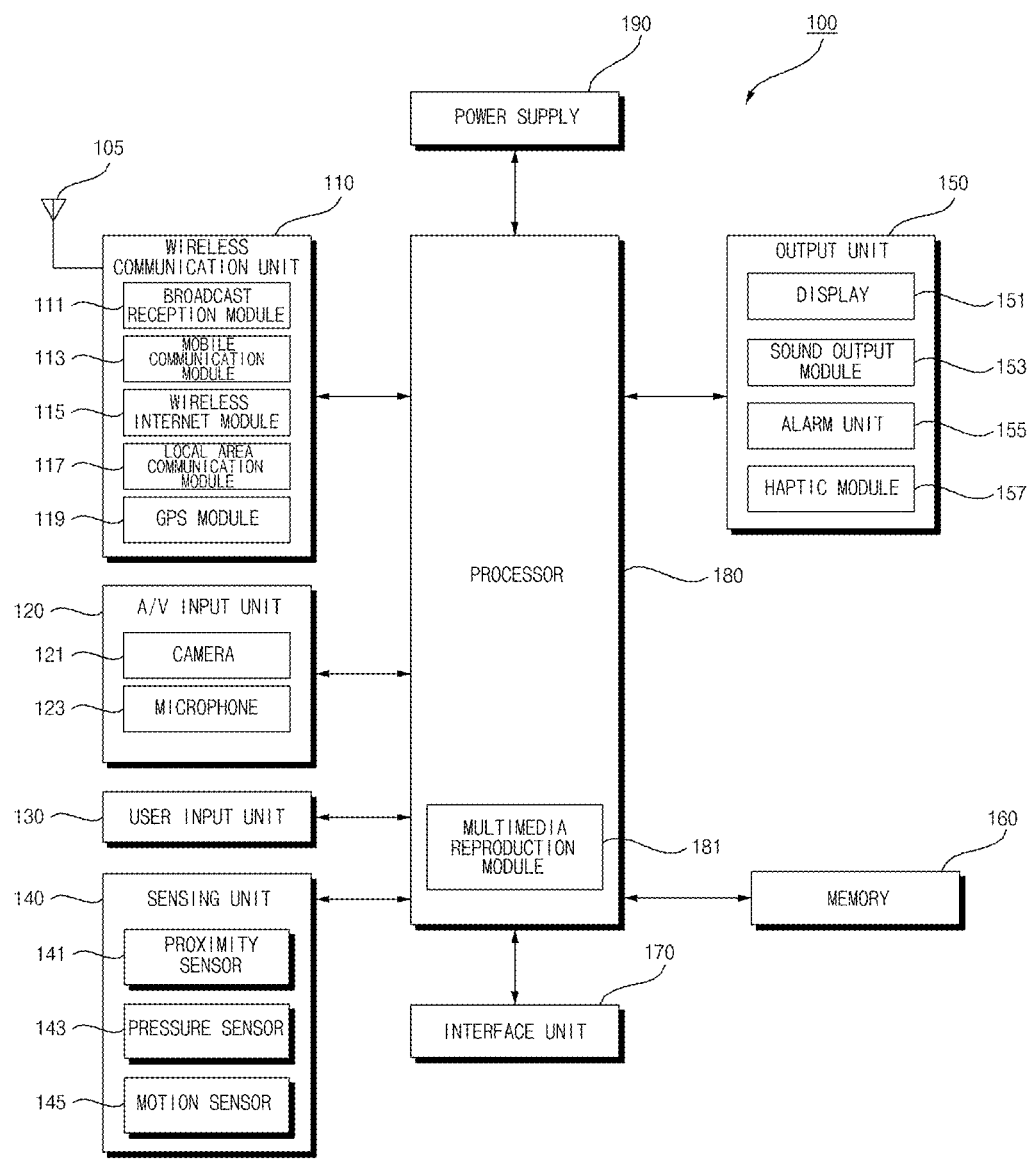
FIG. 2 is a block diagram of a mobile terminal according to an embodiment of the present invention.

FIG. 2 is a block diagram of the mobile terminal 100 according to an embodiment of the present invention. With reference to FIG. 2, a mobile terminal according to an embodiment of the present invention will be described below in terms of elements according to their functions.

Referring to FIG. 2, the mobile terminal 100 may include a wireless communication unit 110, an audio/video (A/V) input unit 120, a sensing unit 140, an output unit 150, a memory 160, an interface unit 170, a processor 180, and a power supply 190. For actual application, as necessary, two or more components may be integrated as one component or one component may be subdivided and configured into two or more components.

The wireless communication unit 110 may include a broadcast reception module 111, a mobile communication module 113, a wireless Internet module 115, a local area communication module 117, a global positioning system (GPS) module 119, and so on.

The broadcast reception module 111 receives at least one of a broadcast signal and broadcast related information from an external broadcast management server through a broadcast channel. In this case, the broadcast channel may include a satellite channel, a terrestrial channel, and so on. The broadcast management server may refer to a server for generating and transmitting at least one of a broadcast signal and broadcast related information or a server for receiving at least one of a pre-generated broadcast signal and broadcast related information and transmitting it a terminal.

The broadcast signal may include a TV broadcast signal, a radio broadcast signal, and a data broadcast signal and may also a broadcast signal obtained by adding a data broadcast signal to a TV broadcast signal or a radio broadcast signal.

The broadcast related information may refer to information related to a broadcast channel, a broadcast program, or a broadcast server provider. The broadcast related information may be provided through a mobile communication network, and in this case, may be received by the mobile communication module 113. The broadcast related information may be present in various forms.

The broadcast reception module 111 receives a broadcast signal using various broadcast systems. In particular, the broadcast reception module 111 may receive a digital broadcast signal using a digital broadcast system such as digital multimedia broadcast-terrestrial (DMB-T), digital multimedia broadcast-satellite (DMB-S), media forward link only (media FLO), digital video broadcast-handheld (DVB-H), and integrated services digital broadcast-terrestrial (ISDB-T). In addition, the broadcast reception module 111 may be configured to be appropriate for any broadcast system for providing a broadcast signal as well as the digital broadcast system. The broadcast signal and/or broadcast related information received through the broadcast reception module 111 may be stored in the memory 160.

The mobile communication module 113 transmits and receives a radio signal to and from at least one of a base station, an external terminal, and a server on a mobile communication network. Here, the radio signal may include various types of data according to transmission and reception of a voice call signal, a video telephony call signal, or text/multimedia messages.

The wireless Internet module 115 may refer to a module for wireless Internet access and may be embodied in or outside the mobile terminal 100. Examples of wireless Internet technologies may include wireless LAN (WLAN), Wi-Fi, wireless broadband (WiBro), world interoperability for microwave access (WiMax), high speed downlink packet access (HSDPA), and so on.

The local area communication module 117 refers to a module for local area communication. Examples of the local area communication may include Bluetooth, radio frequency identification (RFID), infrared data association (IrDA), ultra wideband (UWB), ZigBee, near field communication (NFC), and so on.

The global positioning system (GPS) module 119 receives positional information from a plurality of GPS satellites.

The audio/video (A/V) input unit 120 may be used to input an audio signal or a video signal and may include the camera 121, the microphones 123, and so on. The camera 121 processes an image frame such as a still image or video image acquired by an image sensor in a video call mode or a photograph mode. In addition, the processed image frame may be displayed on a display 151.

The image frame processed by the camera 121 may be stored in the memory 160 or may be externally transmitted through the wireless communication unit 110. In some embodiments, two or more cameras 121 may be included.

The microphone 123 receives an external audio signal through a microphone and processes the signal into electrical voice data in an audio reception mode, for example, a call mode, a voice recording mode, or a voice recognition mode. In addition, in a call mode, the processed voice data may be converted into a form transmissible to a mobile communication base station and may be output through the mobile communication module 113. The microphone 123 may use a de-noising algorithm for removing noise generated when an external audio signal is received.

The plurality of microphones 123 may be arranged at different points. An audio signal received by each microphone may be audio-signal processed by the processor 180 and so on.

The user input unit 130 generates key input data that is input to control an operation of a terminal by a user. The user input unit 130 may include a key pad, a dome switch, a (static pressure/electrostatic) touch pad, and so on, for receiving a command or information according to user push or touch manipulation. In addition, the user input unit 130 may be embodied in a manipulation manner using a jog wheel for rotation of a wheel, a jog dial, a joystick, a finger mouse, and so on. In particular, when a touch pad constitutes a multilayered structure with the display 151 that will be described below, this may be referred to as a touchscreen.

The sensing unit 140 detects a current state of the mobile terminal 100, such as an opening or closing state of the mobile terminal 100, a position of the mobile terminal 100, and whether a user contacts the mobile terminal 100 to generate a sensing signal for controlling an operation of the mobile terminal 100. For example, when the mobile terminal 100 is a slide type phone, the sensing unit 140 may sense whether the slide type phone is opened or closed. In addition, the sensing unit 140 may be in charge of a sensing function related to whether the power supply 190 supplies power, an external device of the interface unit 170 is defective.

The sensing unit 140 may include a proximity sensor 141, a pressure sensor 143, the motion sensor 145, and so on. The proximity sensor 141 may detect an object that approaches the mobile terminal 100 or whether an object is present around the mobile terminal 100 without mechanical contact. The proximity sensor 141 may detect an adjacent object using change in an alternating current (AC) magnetic field or change in a static magnetic field or a rate of change in capacitance. In some embodiments, two or more proximity sensors 141 may be included.

The pressure sensor 143 may detect whether a pressure is applied to the mobile terminal 100, a magnitude of the pressure, or the like. The pressure sensor 143 may be installed at a portion of the mobile terminal 100, a pressure of which needs to be detected, according to a usage environment. When the pressure sensor 143 is installed in the display 151, the pressure sensor 143 may distinguish a touch input via the display 151 and a pressure touch input with a higher pressure than the touch input according to a signal output from the pressure sensor 143. In addition, the pressure sensor 143 may determine a magnitude of pressure applied to the display 151 during pressure touch input according to a signal output from the pressure sensor 143.

The motion sensor 145 detects a position, movement, or the like of the mobile terminal 100 using an acceleration sensor, a gyro sensor, or the like. The acceleration sensor to be used in the motion sensor 145 is a device for converting change in acceleration in one direction into an electrical signal and has entered widespread use with the development of micro-electromechanical systems (MEMS) technologies.

The acceleration sensor is installed in an airbag system of a vehicle to detect collision. There are many types of acceleration sensors including an acceleration sensor for measuring a high acceleration and an acceleration sensor used as an input unit by recognizing minute movement of the human hand to measure a minute acceleration. The acceleration sensor may be generally configured by installing two axes or three axes in one package or may require only one Z-axis according to a usage environment. Accordingly, when an acceleration sensor of an X-axis direction or a Y-axis direction instead of a Z-axis direction needs to be used for any reason, the acceleration sensor may be set on edge using a separate piece of substrate.

The gyro sensor may measure acceleration and a rotation direction based on a standard direction.

The output unit 150 is used to output an audio signal, a video signal, or an alarm signal. The output unit 150 may include the display 151, a sound output module 153, an alarm unit 155, a haptic module 157, and so on.

The display 151 displays and outputs information processed by the mobile terminal 100. For example, when the mobile terminal 100 is in a call mode, the display 151 displays a user interface (UI) or a graphical user interface (GUI) associated with calling. In addition, when the mobile terminal 100 is in a video call mode or a photograph mode, the display 151 may separately or simultaneously display a captured or received image and may display a UI or a GUI.

As described above, when the display 151 and a touchpad are configured as an interlayer structure to constitute a touchscreen, the display 151 may be used as an input device through which information is inputtable via user touch as well as an output device.

When the display 151 is configured as a touchscreen, the display 151 may include a touchscreen panel, a touchscreen panel controller, and so on. In this case, the touchscreen panel may be a transparent panel attached to an external portion of the display 151 and may be connected to an internal bus of the mobile terminal 100. In monitoring a contact result, when there is a touch input, the touchscreen panel transmits corresponding signals to the touchscreen panel controller. The touchscreen panel controller processes the signals and then transmits corresponding data to the processor 180 such that the processor 180 recognizes whether there is a touch input and a portion of the touchscreen, which is touched.

The display 151 may be configured as e-paper. The e-paper is a type of reflective display and has excellent visual characteristics such as high resolution, a wide viewing angle, and a light white background, like existing paper and ink. The e-paper may be embodied on any substrate such as plastic, metal, and paper, maintain an image even after power is shut off, and does not include a power source of a backlight, thereby increasing a lifespan of a battery of the mobile terminal 100. The e-paper may use a semispherical type twist ball charged with electrostatic charges or use electrophoresis, a microcapsule, and so on.

In addition, the display 151 may include at least one of a liquid crystal display, a thin film transistor-liquid crystal display, an organic light-emitting diode, a flexible display, and a three-dimensional (3D) display. In some embodiments, according to a type of the mobile terminal 100, two or more displays 151 may be included. For example, the mobile terminal 100 may simultaneously include an external display (not shown) and an internal display (not shown).

The sound output module 153 receives audio data that is received from the wireless communication unit 110 or stored in the memory 160 in a call signal reception mode, a call mode, a voice recording mode, a voice recognition mode, a broadcast reception mode, or the like. In addition, the sound output module 153 outputs an audio signal associated with a function performed by the mobile terminal 100, for example, a call signal receiving sound, a message receiving sound, or the like. The sound output module 153 may include a speaker, a buzzer, and so on.

The alarm unit 155 outputs a signal for indicating occurrence of an event of the mobile terminal 100. Examples of the event that occurs in the mobile terminal 100 include call signal reception, message reception, key signal input, and so on. The alarm unit 155 outputs a signal for indicating event occurrence in a different form from an audio signal or a video signal. For example, a signal may be output in the form of vibration. Upon receiving a call signal or a message, the alarm unit 155 may output a signal in order to indicate the reception. In addition, when a key signal is input to the alarm unit 155, the alarm unit 155 may output a signal as feedback to key signal input. A user may recognize event occurrence through the signal output from the alarm unit 155. The signal for indicating event occurrence in the mobile terminal 100 may also be output through the display 151 or the sound output module 153.

The haptic module 157 generates various haptic effects that the user experiences. A representative example of the haptic effect generated by the haptic module 157 is a vibration effect. When the haptic module 157 generates vibration as a haptic effect, the intensity, pattern, and so on of the vibration generated by the haptic module 157 is convertible, and different vibrations may be synthesized and output or may be sequentially output.

The haptic module 157 may generate various haptic effects such as an effect of stimulus due to arrangement of pins that are perpendicularly moved to a contact skin surface, an effect of stimulus due to spraying force or suction force of air through a spray port or a suction port, an effect of stimulus passing over a skin surface, an effect of stimulus via contact with an electrode, an effect of stimulus due to electrostatic force, and an effect of reproduction of cool and warm feeling using a device that is capable of absorbing or generating heat, in addition to vibration. The haptic module 157 may be configured to allow a user to experience a haptic effect through kinesthesia of the user's finger, arm, and so on as well as to transmit a haptic effect via direct contact. According to specifications of the mobile terminal 100, two or more haptic modules 157 may be included.

The memory 160 may store a program for processing and controlling the processor 180 and perform a function of temporally storing input or output data items (e.g., a phonebook, a message, a still image, and a video image).

The memory 160 may include at least one storage medium of a flash memory, a hard disk, a multimedia card micro, a card type memory (e.g., SD or XD memory), a random access memory (RAM), and a read only memory (ROM). The mobile terminal 100 may manage a web storage that performs a storage function of the memory 160 over the Internet.

The interface unit 170 functions as an interface with any external device connected to the mobile terminal 100. An example of the external device connected to the mobile terminal 100 may include a wired/wireless headset, an external charger, a wired/wireless data port, a memory card, a subscriber identification module (SIM) card, a card socket such as a user identity module (UIM) card, an audio input/output (I/O) terminal, a video I/O terminal, an earphone, and so on. The interface unit 170 may receive data or power from the external device and transmit the data or power to components inside the mobile terminal 100 and may allow data in the mobile terminal 100 to be transmitted to an external device.

When the mobile terminal 100 is connected to an external cradle, the interface unit 170 may function as a path for supplying power to the mobile terminal 100 from the connected cradle or a path for transmitting various command signals input from the cradles to the mobile terminal 100 by a user.

In general, the processor 180 controls an operation of each of the above components to control an overall operation of the mobile terminal 100. For example, the processor 180 performs control and processing associated with voice call, data communication, video call, and so on. In addition, the processor 180 may include a multimedia reproduction module 181 for multimedia reproduction. The multimedia reproduction module 181 may be configured as hardware in the processor 180 or configured as separate software from the processor 180. The processor 180 may include an application processor (not shown) for driving an application. Alternatively, the application processor (not shown) may be separately installed from the processor 180.

In addition, the power supply 190 receives external and internal power according to control of the processor 180 and supplies power required for an operation each component.

The mobile terminal 100 with the aforementioned configuration may include a wireless and wired communication system and a satellite based communication system and may be configured to be operated in a communication system in which data is transmittable through a frame or a packet.

Figure 3:
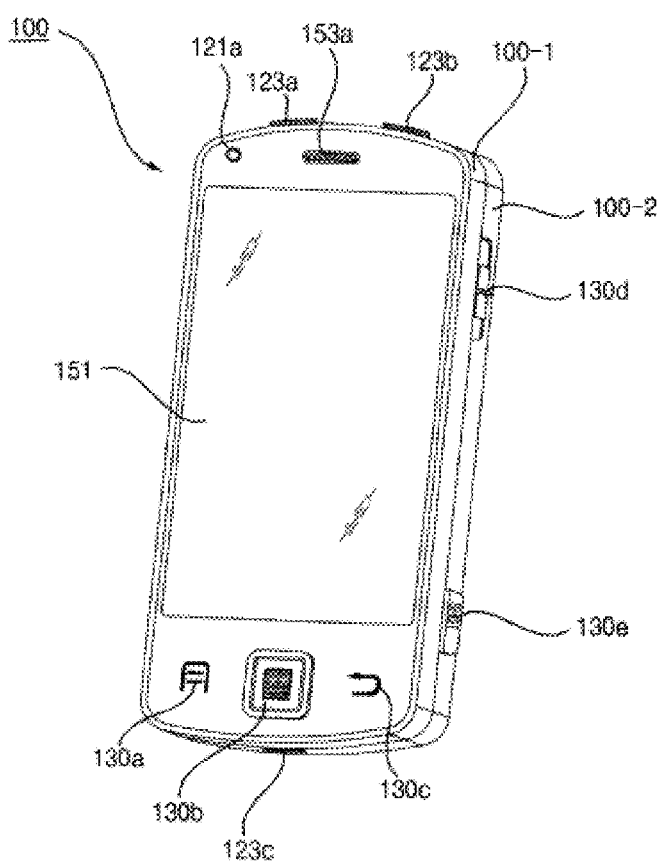
FIG. 3 is a perspective view of the mobile terminal of FIG. 2 viewed from the front.
Figure 4:
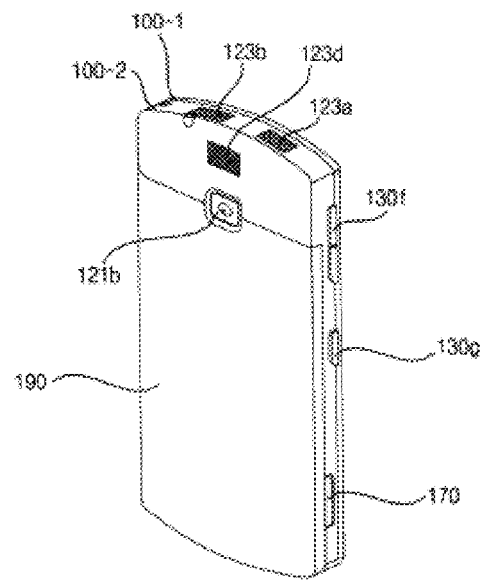
FIG. 4 is a rear perspective view of the mobile terminal illustrated in FIG. 3.

FIG. 3 is a perspective view of the mobile terminal 100 of FIG. 2 viewed from the front. FIG. 4 is a rear perspective view of the mobile terminal 100 illustrated in FIG. 3. Hereinafter, with reference to FIGS. 3 and 4, a mobile terminal associated with the present invention will be described according to its outer appearance in terms of components. Hereinafter, for convenience of description, a bar-type mobile terminal including a front touchscreen among various types of mobile terminals such as a folder type mobile terminal, a bar type mobile terminal, a swing type mobile terminal, and a slider type mobile terminal will be described. However, the mobile terminal 100 is not limited to a bar type mobile terminal and may be applied to any type of mobile terminal including the aforementioned type of mobile terminal.

Referring to FIG. 3, a case forming an outer appearance of the mobile terminal 100 is formed by a front case 100-1 and a rear case 100-2. Various electronic components are installed in a space formed by the front case 100-1 and the rear case 100-2.

The display 151, a first sound output module 153a, a first camera 121a, and first to third user input units 130a, 130b, and 130c may be disposed in a main body, in detail, the front case 100-1. In addition, a fourth user input unit 130d, a fifth user input unit 130e, and first to third microphones 123a, 123b, and 123c may be disposed on a lateral surface of the rear case 100-2.

The display 151 may be configured to operate as a touchscreen to receive information via user touch by stacking a touchpad on the display 151 to constitute a layer structure.

The first sound output module 153a may be embodied in the form of a receiver or a speaker. The first camera 121a may be embodied in the form appropriate to capture a still image or a video image of a user and so on. In addition, the microphone 123 may be embodied in the form appropriate to receive user voice, other sounds, and so on.

The first to fifth user input units 130a, 130b, 130c, 130d, and 130e and sixth and seventh user input units 130f and 130g that will be described below may be collectively referred to as the user input unit 130 and may apply any tactile manner as long as a user manipulates the user input unit 130 while experiencing tactile sensation.

For example, the user input unit 130 may be embodied as a dome switch or a touchpad, for receiving a command or information according to user push or touch manipulation or embodied in a manipulation manner using a jog wheel for rotation of a wheel, a jog dial, a joystick, a finger mouse, and so on. In terms of a function, the first to third user input units 130a, 130b, and 130c are used to input a command such as start, end, and scroll, and the fourth user input unit 130d is used to input selection of an operation mode, and so on. In addition, the fifth user input unit 130e may operate as a hot key for activating a special function of the mobile terminal 100.

The first to second microphones 123a and 123b may be disposed on the rear case 100-2, that is, on the mobile terminal 100 in order to collect signals, and the third microphone 123c may be disposed below the rear case 100-2, that is, below the mobile terminal 100 in order to collect signals.

Referring to FIG. 4, a second camera 121b, and a fourth microphone 123d may be additionally installed on a rear surface of the rear case 100-2, and the sixth and seventh user input units 130f and 130g and the interface unit 170 may be disposed on a lateral surface of the rear case 100-2.

The second camera 121b may have a substantially opposite photograph direction to the first camera 121a and have different pixels from the first camera 121a. A flash (not shown) and a mirror (not shown) may be further disposed adjacent to the second camera 121b. In addition, another camera may be disposed adjacent to the second camera 121b in order to capture a 3D stereoscopic image.

The flash flashes light toward an object while the second camera 121b photographs the object. The mirror reflects a user face when the user wants to photograph himself or herself (self photography) using the second camera 121b.

A second sound output module (not shown) may be additionally disposed in the rear case 100-2. The second sound output module may embody a stereo function together with the first sound output module 153a and may be used for calling in a speaker phone mode.

The interface unit 170 may be used as a path for exchanging data with an external device. In addition, a broadcast signal receiving antenna (not shown) other than an antenna for calling may be disposed in one region of the front case 100-1 and the rear case 100-2. The antenna may be installed to protrude outside the rear case 100-2.

The power supply 190 for supplying power to the mobile terminal 100 may be installed at a side of the rear case 100-2. The power supply 190 may be, for example, a dischargeable battery and may be detachably coupled to the rear case 100-2 for charging.

The fourth microphone 123d may be disposed on a front surface of the rear case 100-2, that is, a rear surface of the mobile terminal 100 in order to collect audio signals.

According to the exemplary embodiment in the present invention, the second camera 121b and so on are disposed in the rear case 100-2 but are not limited thereto. In addition, although the second camera 121b is not separately included, the first camera 121a may be rotatably configured to perform photography in directions including a photograph direction of the second camera 121b.

Figure 5A:
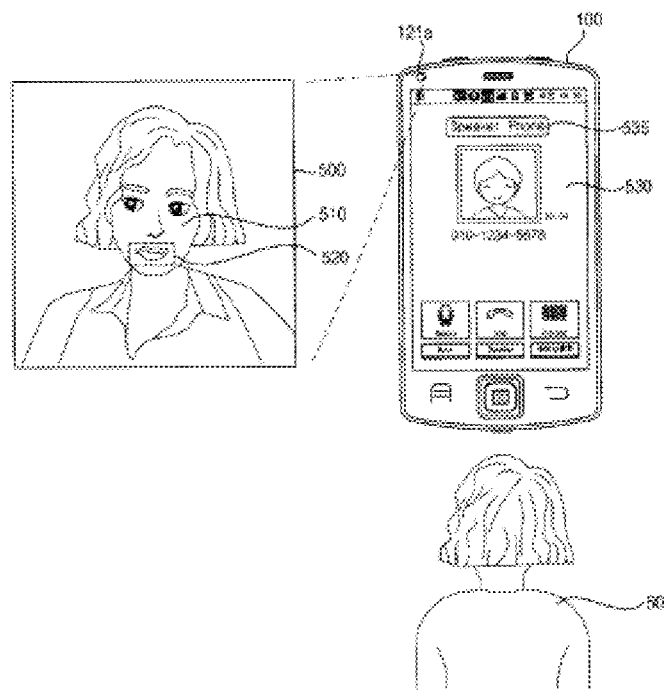
FIGS. 5A to 5C are diagrams illustrating elements used for audio beamforming associated to the present invention.
Figure 5B:
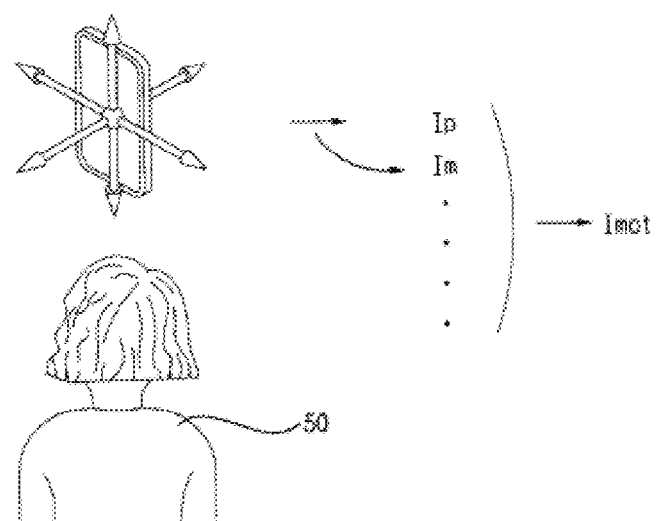
Figure 5C:
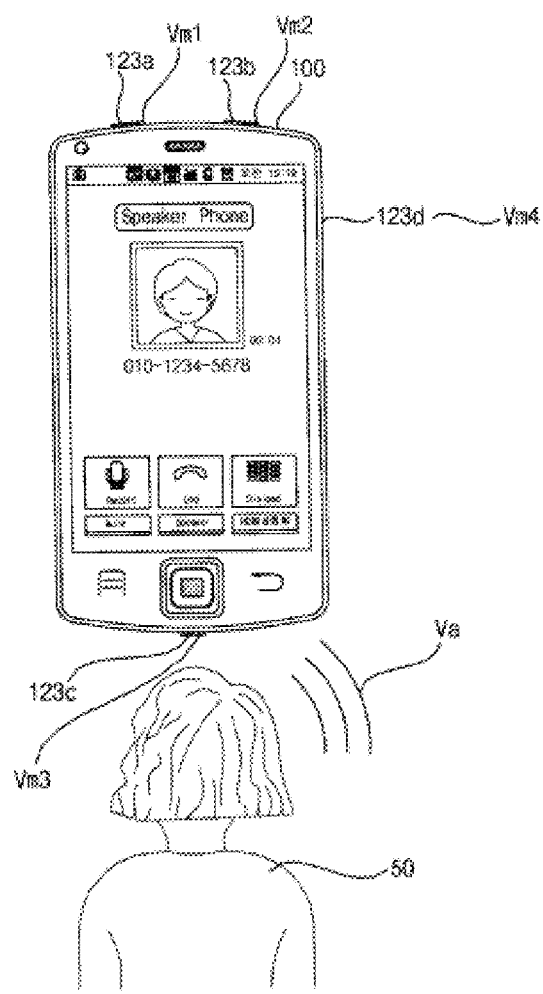

FIGS. 5A to 5C are diagrams illustrating elements used for audio beamforming associated to the present invention.

FIG. 5A illustrates the case in which the camera 121a is activated to acquire a photograph image 500 formed by photographing the speaker 50 in an audio reception mode of the mobile terminal 100. In particular, FIG. 5A illustrates the case in which the mobile terminal 100 operates in a speaker mode of the audio reception mode. Accordingly, the mobile terminal 100 may display the speaker mode image 530 containing the object 535, indicating a speaker mode.

FIG. 5B illustrates the case in which motion information Imot including positional information (Ip) of x-axis, y-axis, and z-axis and velocity (or acceleration) information (Om) according to movement such as rotation is acquired from the motion sensor 145 during movement of the mobile terminal 100.

FIG. 5C illustrates the case in which the microphones 123a, 123b, 123c, and 123d collect respective corresponding audio signals Vm1, Vm2, Vm3, and Vm4 when the speaker 50 outputs voice Va in an audio reception mode, in particular, in a speaker mode of the mobile terminal 100.

According to an embodiment of the present invention, in the mobile terminal 100 including the plurality of microphones 123a, 123b, 123c, and 123d, an audio beam is formed in order to collect optimum audio signals in consideration of a position and movement of a speaker, movement of a mobile terminal, and so on. To this end, as illustrated in FIGS. 5A to 5C, the audio beam may be formed based on at least one of a photograph image acquired from the camera 121, motion information Imot acquired from the motion sensor 145, and the audio signal collected by the microphones 123a, 123b, 123c, and 123d.

Figure 5D:
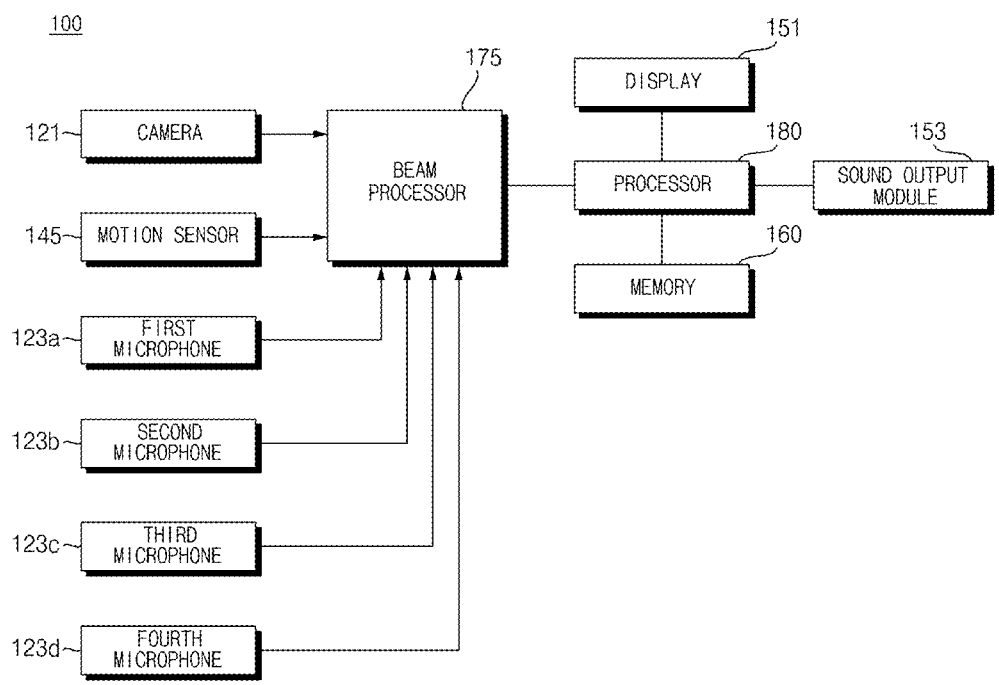
FIG. 5D is a schematic block diagram for audio beamforming processing associated with the present invention.

FIG. 5D is a schematic block diagram for audio beamforming processing associated with the present invention. Referring to the diagram, an image display apparatus 100 may include a beam processor 175 for forming an audio beam and so on.

The beam processor 175 may receive a photograph image acquired from the camera 121, motion information Imot acquired from the motion sensor 145, and audio signals collected from the microphones 123a, 123b, 123c, and 123d.

For example, when a mobile terminal and a speaker are fixed without movement, movement from the motion sensor 145 is not detected, the beam processor 175 may completely form the audio beam based on an image captured by photographing the speaker, in particular, a position of the speaker's mouth.

As another example, when the mobile terminal is fixed and the speaker moves, the beam processor 175 may form an audio beam for collecting audio signals from the speaker based on a photograph image captured by photographing the moving speaker or a photograph image captured by photographing the moving speaker and the received audio signals.

As another example, when the mobile terminal moves, the beam processor 175 may form an audio beam for collecting audio signals from the speaker based on a photograph image captured by photographing the moving speaker and the received audio signals or photograph image captured by photographing the moving speaker, motion information of a mobile terminal form a motion sensor, and the received audio signals.

As another example, when there is a plurality of speakers with respect to a mobile terminal, the beam processor 175 may form a plurality of audio beams corresponding to the respective speakers.

As another example, when there is a plurality of speakers, if a speaker except for a speaker, for whom an audio beam is already formed, inputs an audio signal, the beam processor 175 may form a second audio beam based on a photograph image from a camera and an audio signal from another speaker.

The beam processor 175 or the processor 180 may signal-process the audio signals collected by the microphones 123a, 123b, 123c, and 123d based on formed audio beam in an audio reception mode. For example, the beam processor 175 or the processor 180 may adjust magnitude or a phase value of the received audio signal according to a bandwidth of the audio beam and a magnitude setting value based on a band.

In a speaker mode, the sound output module 153 may output an audio signal that is received and signal-processed according to the formed audio beam.

Although FIG. 5D illustrates the case in which the beam processor 175 is separated from the processor 180, the beam processor 175 may be included in the processor 180.

Figure 6:
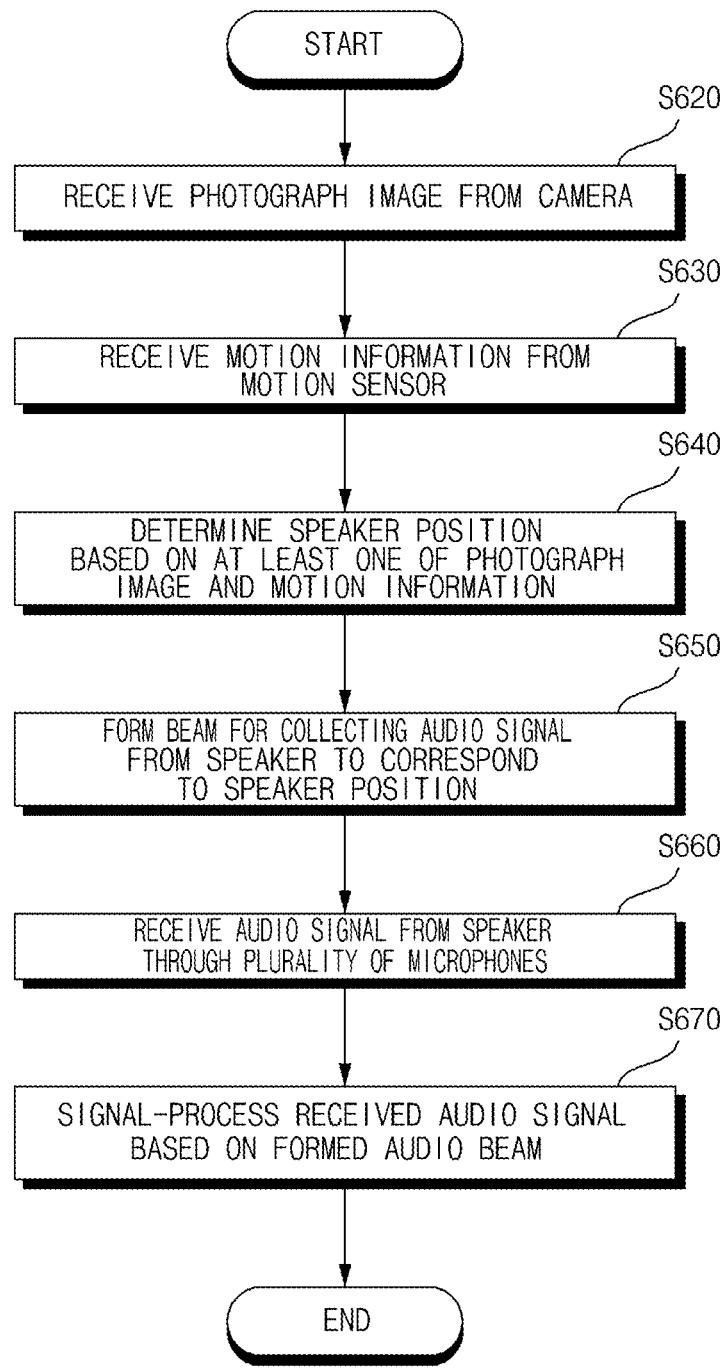
FIG. 6 is a flowchart of an operating method of a mobile terminal according to an embodiment of the present invention.

FIG. 6 is a flowchart of an operating method of a mobile terminal according to an embodiment of the present invention. FIGS. 7A to 15C are diagrams for explanation of various examples of the operating method of the mobile terminal of FIG. 6.

Referring to FIG. 6, the mobile terminal 100 receives a photograph image captured through a camera in an audio reception mode (S610). In addition, motion information is received from a motion sensor (S630).

In the audio reception mode, the mobile terminal 100 may activate the camera 121, the motion sensor 145, and the plurality of microphones 123a, 123b, 123c, and 123d. In addition, the mobile terminal 100 receives a photograph image, and motion information such as sensed positional information and speed information.

Then a speaker position is determined based on at least one of the photograph image and the motion information (S640). In addition, an audio beam for collecting audio signals from the speaker is formed to correspond to the speaker position (S650).

The beam processor 175 in the mobile terminal 100 may receive the photograph image acquired from the camera 121, the motion information Imot acquired from the motion sensor 145, and audio signals collected from the microphones 123a, 123b, 123c, and 123d.

In addition, like in the various examples described with reference to FIG. 5D, the beam processor 175 may form an audio beam based on at least one of the photograph image acquired from the camera 121, motion information Imot acquired from the motion sensor 145, and the audio signal collected from the microphones 123a, 123b, 123c, and 123d.

For example, when the speaker 50 is positioned in front of the mobile terminal 100, an audio field around the mobile terminal 100 may be set with a magnitude that is highest at an angle at which the speaker 50 is positioned and is gradually reduced at other angles.

As another example, when the speaker 50 is positioned at an angle of approximately 15 degrees, but not in front of the mobile terminal 100, an audio field around the mobile terminal 100 may be set with a magnitude that is highest at an angle of approximately 15 degrees at which the speaker 50 is positioned and is gradually reduced at other angles based on approximately 15 degrees.

Then an audio signal is received from the speaker through a plurality of microphones (S660). In addition, the received audio signal is processed based on the formed audio beam (S670).

When the speaker outputs voice through the microphones 123a, 123b, 123c, and 123d, the mobile terminal 100 may receive audio signals from the speaker.

In addition, the beam processor 175 or the processor 180 in the mobile terminal 100 may signal-process the audio signal collected from the microphones 123a, 123b, 123c, and 123d based on the formed audio beam in an audio reception mode. For example, the beam processor 175 or the processor 180 may adjust magnitude or a phase value of the received audio signal according to a bandwidth of the audio beam and a magnitude setting value based on a band.

Accordingly, an optimum audio signal may be received to correspond to the position of the speaker 50, thereby enhancing user convenience.

Hereinafter, various examples of the operating method of FIG. 6 will be described with reference to FIGS. 7A to 12F.

Figure 7A:
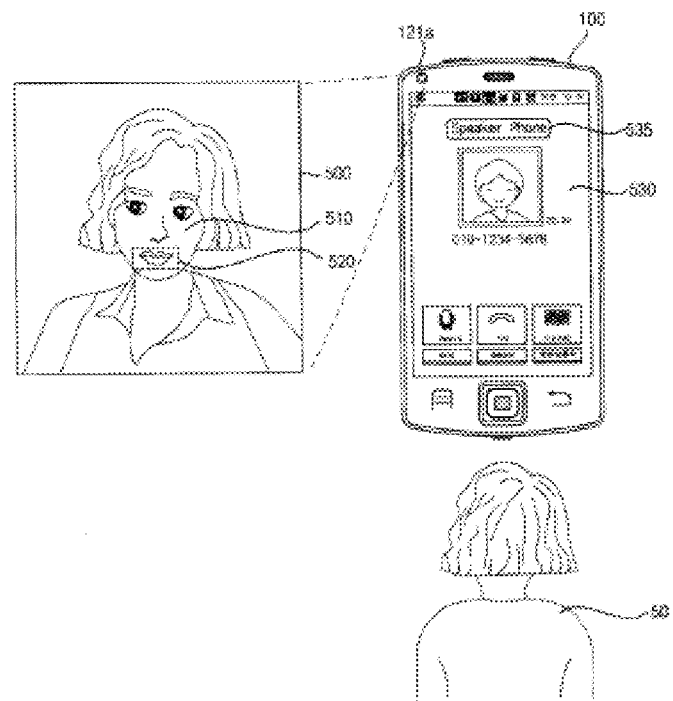
FIGS. 7A to 15C are diagrams for explanation of various examples of the operating method of the mobile terminal of FIG. 6.

FIG. 7A illustrates the case in which the camera 121*a* is activated to acquire the photograph image 500 formed by photographing the speaker 50 in an audio reception mode of the mobile terminal 100 when a mobile terminal and a speaker are fixed without movement. In particular, FIG. 7A illustrates the case in which the mobile terminal operates in a speaker mode of the audio reception mode. Accordingly, the mobile terminal 100 may display the speaker mode image 530 containing the object 535 indicating a speaker mode.

The beam processor 175 in the mobile terminal 100 may derive positional information based on the photograph image 500 formed by photographing the speaker 50. In particular, the positional information of a mouth 520 of a speaker 510 in the photograph image 500 may be derived.

The positional information may be positional information of the speaker's mouth and may be positional information on x axis, y axis, and z axis.

Figure 7B:
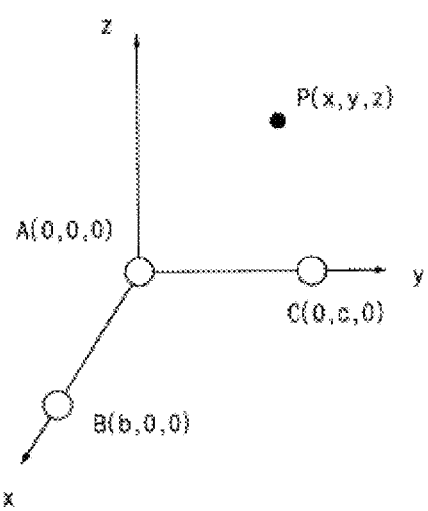

FIG. 7B illustrates the case in which a speaker, in particular, the speaker's mouth is positioned at a position P in an x, y, and z-axes space.

The beam processor 175 in the mobile terminal 100 may form an audio beam for collecting audio signals from the speaker 50 based on the derived positional information of the speaker 50.

The audio beam may be formed to correspond to positions of the speaker disposed in the x, y, and z-axes space. For example, the audio beam may be embodied as audio field corresponding to the speaker position based on an x, y, and z-axes space-based orthogonal coordinate system. The audio field may be set with different magnitudes according to a position (x, y, and z coordinates).

As another example, the audio beam may be set to correspond to a speaker position based on cylindrical coordinates represented by a distance and an angle based on a mobile terminal. Hereinafter, the present invention will be described in terms of cylindrical coordinates.

Figure 8A:
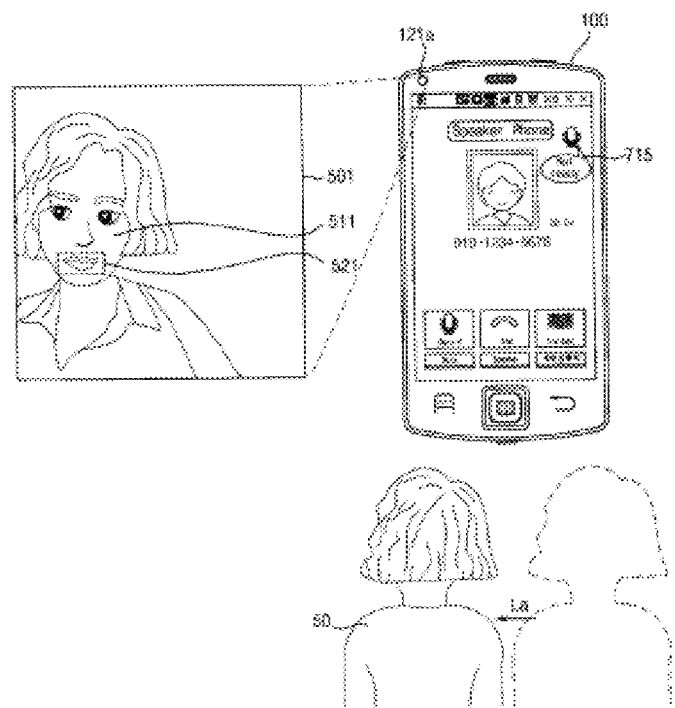
Figure 8B:
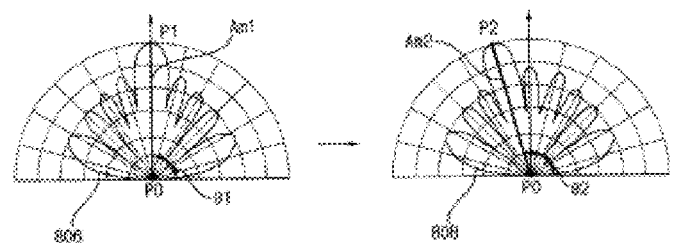

FIG. 8B illustrates an audio beam 806 based on cylindrical coordinates. When a mobile terminal is positioned at a position P0 and a speaker is positioned at a position P1, an angle between the mobile terminal and the speaker is 90 degrees ($\theta 1$) on the cylindrical coordinates, and thus the beam processor 175 in the mobile terminal 100 may form the audio beam 806 as illustrated in FIG. 8B. As seen from the diagram, magnitude Am1 at 90 degrees for audio-signal processing is highest and magnitude at other angles is gradually reduced.

Figure 7C:
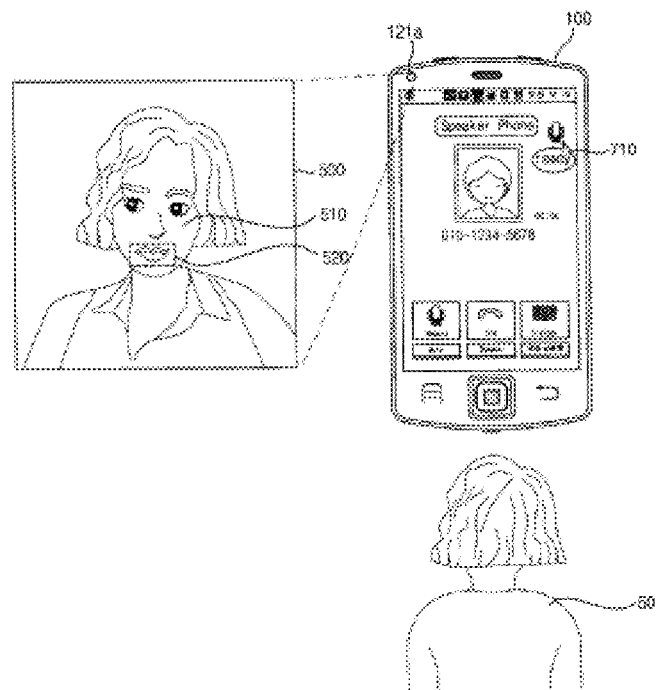

When the audio beam 806 of FIG. 8B is formed, the processor 180 may display an object 710 indicating that an audio beam is completely formed, on the speaker mode image 530, as illustrated in FIG. 7C. Accordingly, the speaker may recognize that the audio beam is completely formed. In addition, voice may be output simultaneously when the audio beam is completely formed.

Figure 7D:
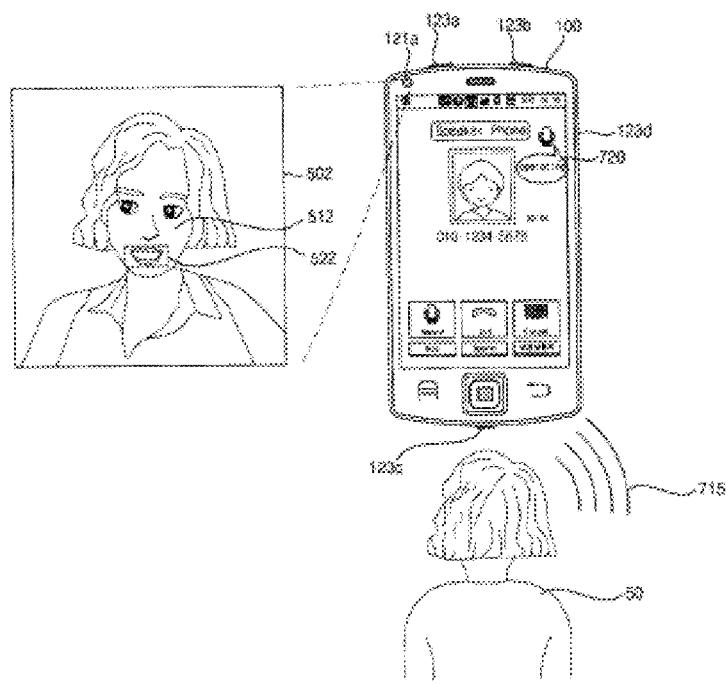

FIG. 7D illustrates the case in which the speaker 50 outputs voice 715 as an audio beam is completely formed. The camera 121*a* may acquire a photograph image 502 captured by photographing a speaker. In this case, the photograph image 502 includes an image 522 of an open mouth of a speaker 512.

The beam processor 175 or the processor 180 may recognize that a speaker outputs audio based on audio signal received through the photograph image 502 and the microphones 123*a*, . . . , 123*d* and signal-process the audio signals received from the microphones 123*a*, . . . , 123*d* according to the formed audio beam 806. For example, the beam processor 175 or the processor 180 may set an audio signal received from the microphones 123*a* and 123*b* disposed on the mobile terminal 100 with a high gain (or magnitude) and set an audio signal received from the microphone 123*d* disposed behind the mobile terminal 100 with a low gain.

The beam processor 175 or the processor 180 may perform post-processing such as noise removal after signal processing according to the formed audio beam. Accordingly, an optimum audio signal may be acquired.

As illustrated in FIG. 7D, the processor 180 may display an object 720 indicating that the audio signal is processed according to the formed audio beam, on the speaker mode image 530. Accordingly, a user may recognize that an audio reception mode is normally executed.

FIG. 8A illustrates the case in which the camera 121*a* is activated in an audio reception mode of the mobile terminal 100 to acquire a photograph image 501 formed by photographing the moving speaker 50 in an audio reception mode of the mobile terminal 100 when a mobile terminal is fixed and a speaker is moved to the left (to the right based on the mobile terminal).

In FIGS. 7A to 7D, when the audio beam 806 is formed based on a direction of 90 degrees, a speaker is moved, it is necessary to update an audio beam, as illustrated in FIG. 8A.

In this case, the processor 180 may detect movement of the moving speaker based on the photograph image 501 and perform control to display an object 715 indicating that an audio beam is not formed, as illustrated in the drawings.

In addition, the beam processor 175 updates the audio beam in response to the movement of the speaker.

The beam processor 175 in the mobile terminal 100 may derive positional information of the speaker 50 based on the photograph image 501 formed by photographing the speaker 50. In particular, the positional information of a mouth 521 of a speaker 511 in the photograph image 501 may be derived.

When the speaker 50 moves to the left as much as La, the beam processor 175 may determine that the speaker 50 moves to the right based on the mobile terminal based on the photograph image 501 formed by photographing the speaker 50 and may form an audio beam 808 as illustrated in FIG. 8B.

When a mobile terminal is positioned at a position P0 and a speaker is positioned at a position P2, an angle between the mobile terminal and the speaker is 105 degrees ($\theta 2$) on the cylindrical coordinates, and thus the beam processor 175 in the mobile terminal 100 may form the audio beam 808 as illustrated in FIG. 8B. As seen from the diagram, magnitude Am2 at 105 degrees for audio-signal processing is highest and magnitude at other angles is gradually reduced.

Figure 8C:
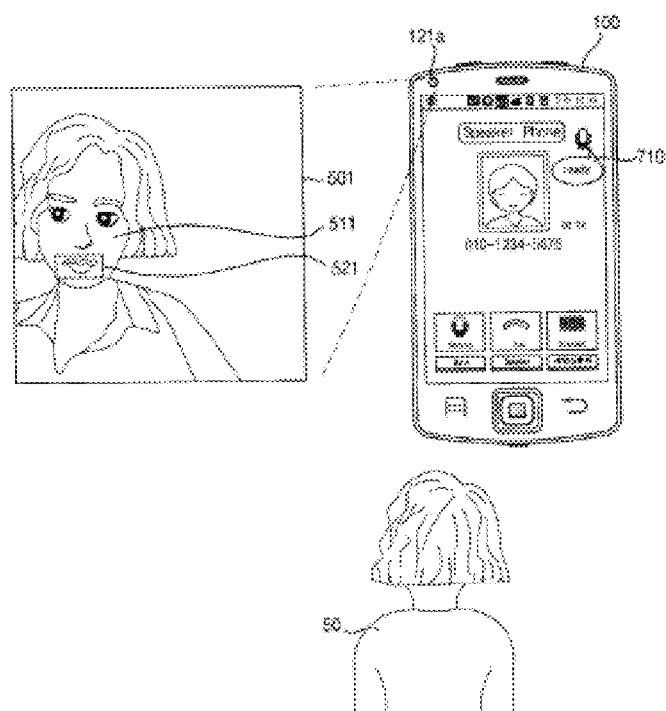

When the audio beam 808 of FIG. 8B is formed, the processor 180 may display the object 710 indicating that an audio beam is completely formed, on the speaker mode image 530, as illustrated in FIG. 8C. Accordingly, the speaker may recognize that the audio beam is completely formed to correspond to movement of the speaker. In addition, voice may be output simultaneously when the audio beam is completely formed.

Figure 8D:
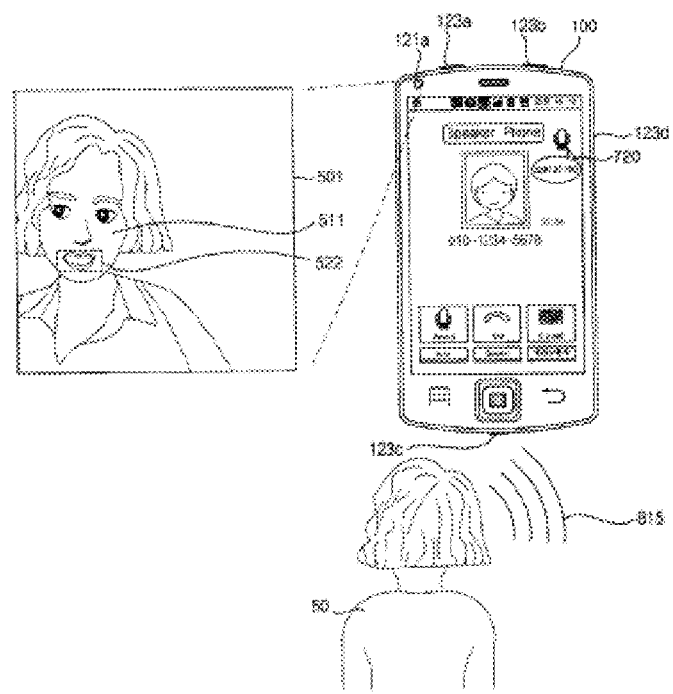

FIG. 8D illustrates the case in which the speaker 50 outputs voice 815 as an audio beam is completely formed. The camera 121*a* may acquire the photograph image 501 captured by photographing a speaker. In this case, the photograph image 501 includes the image 522 of an open mouth of the speaker 511.

The beam processor 175 or the processor 180 may recognize that a speaker outputs audio based on audio signal received through the photograph image 501 and the microphones 123*a*, . . . , 123*d* and signal-process the audio signals received from the microphones 123*a*, . . . , 123*d* according to the formed audio beam 808. For example, the beam processor 175 or the processor 180 may set an audio signal received from the first microphone 123*a* with a higher gain (or magnitude) than the second microphone 123b among microphones disposed on the mobile terminal 100.

The beam processor 175 or the processor 180 may perform post-processing such as noise removal after signal processing according to the formed audio beam. Accordingly, an optimum audio signal may be acquired.

As illustrated in FIG. 8D, the processor 180 may display the object 720 indicating that the audio signal is processed according to the formed audio beam, on the speaker mode image 530. Accordingly, a user may recognize that an audio reception mode is normally executed.

Figure 9A:
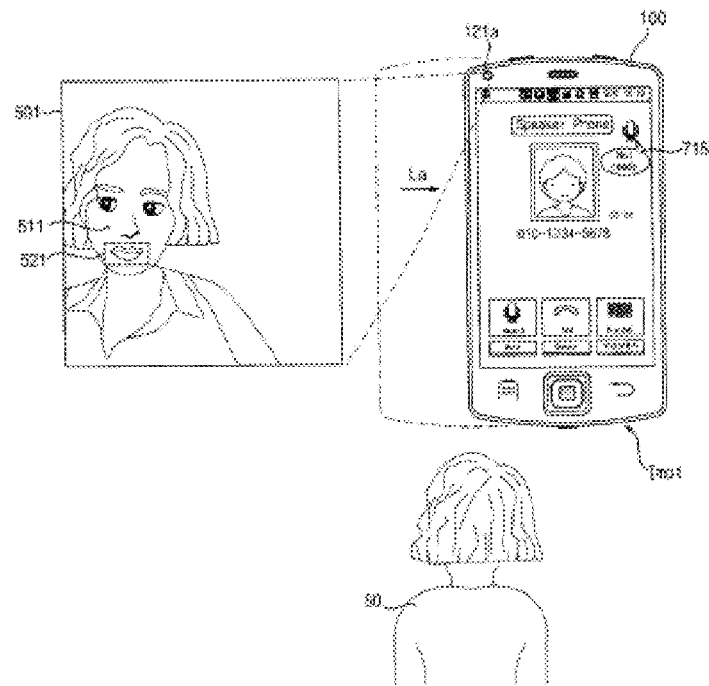

FIG. 9A is similar to FIG. 8A except that a mobile terminal instead of a speaker moves. FIG. 9A illustrates the case in which the camera 121a is activated to acquire the photograph image 501 formed by photographing the moving speaker 50 in an audio reception mode of the mobile terminal 100 when the mobile terminal 100 is moved to the right. In particular, FIG. 9A illustrates the case in which the mobile terminal 100 moves to the right as much as La.

In FIGS. 7A to 7D, when the audio beam 806 is formed based on a direction of 90 degrees, the mobile terminal 100 is moved, it is necessary to update an audio beam, as illustrated in FIG. 9A.

In this case, the processor 180 may detect movement of the mobile terminal 100 based on the photograph image 501 formed by photographing the moving speaker and motion information of the motion sensor 145 and perform control to display the object 715 indicating that an audio beam is not formed, as illustrated in the drawings.

In addition, the beam processor 175 updates the audio beam in response to the movement of the mobile terminal 100.

The beam processor 175 in the mobile terminal 100 may derive positional information of the speaker 50 based on the photograph image 501 formed by photographing the speaker 50. In particular, the positional information of the mouth 521 of the speaker 511 in the photograph image 501 may be derived.

When the mobile terminal 100 moves to the right as much as La, the beam processor 175 may form the audio beam 808 based on the photograph image 501 formed by photographing the speaker 50 and motion information including information of right movement, acquired from the motion sensor 145, as illustrated in FIG. 8B.

Figure 9B:
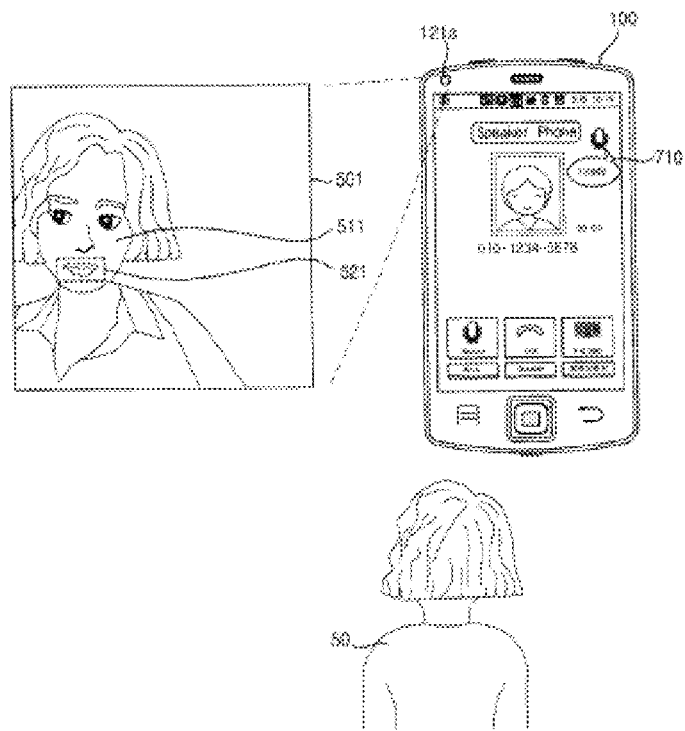

When the audio beam 808 of FIG. 8B is formed, the processor 180 may display the object 710 indicating that an audio beam is completely formed, on the speaker mode image 530, as illustrated in FIG. 9B. Accordingly, the speaker may recognize that the audio beam is completely formed to correspond to movement of the speaker. In addition, voice may be output simultaneously when the audio beam is completely formed.

Figure 9C:
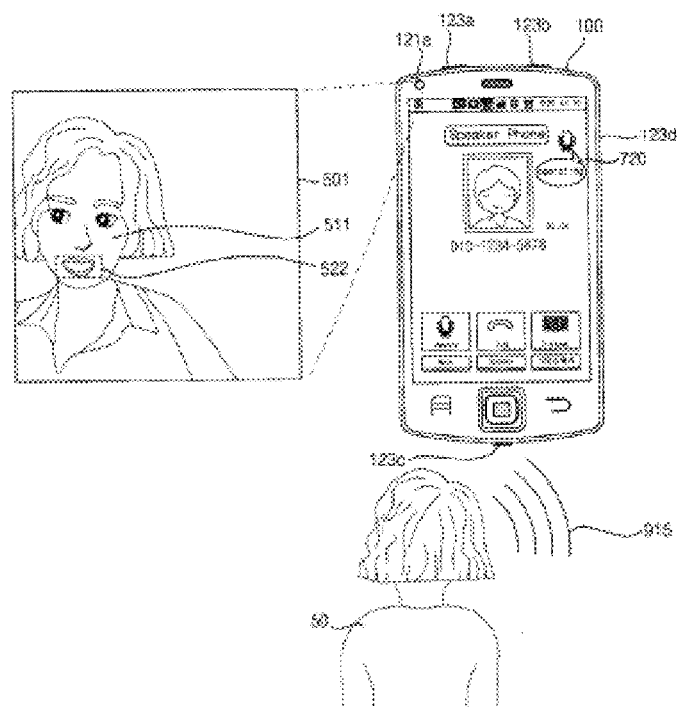

FIG. 9C illustrates the case in which the speaker 50 outputs voice 915 as an audio beam is completely formed. The camera 121a may acquire the photograph image 501 captured by photographing a speaker. In this case, the photograph image 501 includes the image 522 of an open mouth of the speaker 511.

The beam processor 175 or the processor 180 may recognize that a speaker outputs audio based on audio signal received through the photograph image 501 and the microphones 123a, ..., 123d and signal-process the audio signals received from the microphones 123a, ..., 123d according to the formed audio beam 808. For example, the beam processor 175 or the processor 180 may set an audio signal received from the microphone 123a with a higher gain (or magnitude) than the second microphone 123b among microphones disposed on the mobile terminal 100.

The beam processor 175 or the processor 180 may perform post-processing such as noise removal after signal processing according to the formed audio beam. Accordingly, an optimum audio signal may be acquired.

As illustrated in FIG. 9C, the processor 180 may display the object 720 indicating that the audio signal is processed according to the formed audio beam, on the speaker mode image 530. Accordingly, a user may recognize that an audio reception mode is normally executed.

FIGS. 10A to 10D are diagrams for comparing and explaining an audio beam when a speaker stops and an audio beam when the speaker moves.

Figure 10A:
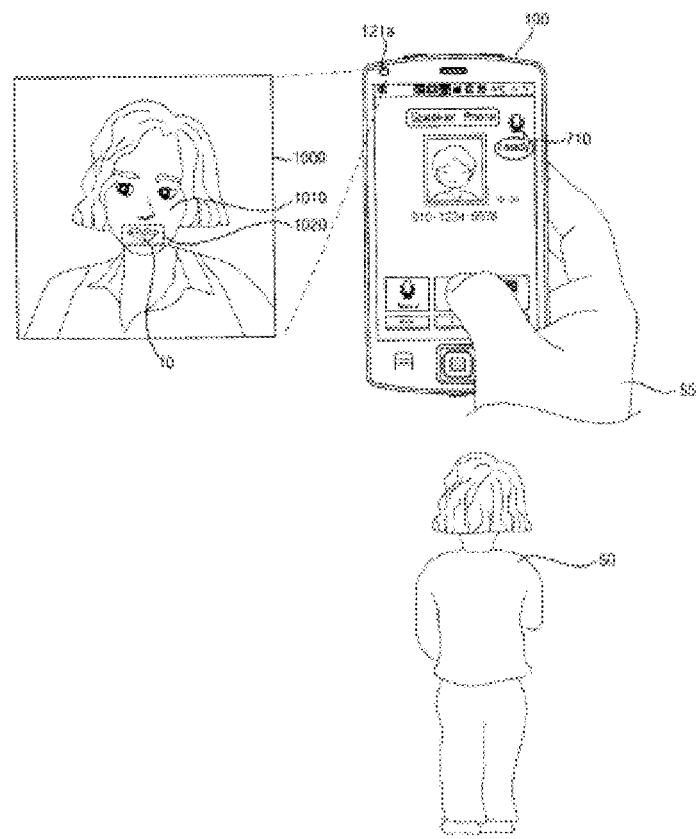

FIG. 10A illustrates the case in which a mobile terminal is operated in a speaker mode during a standing mode. As described above, an audio beam may be formed based on an image 100 captured by the camera 121a, as illustrated in FIG. 10C.

Figure 10B:
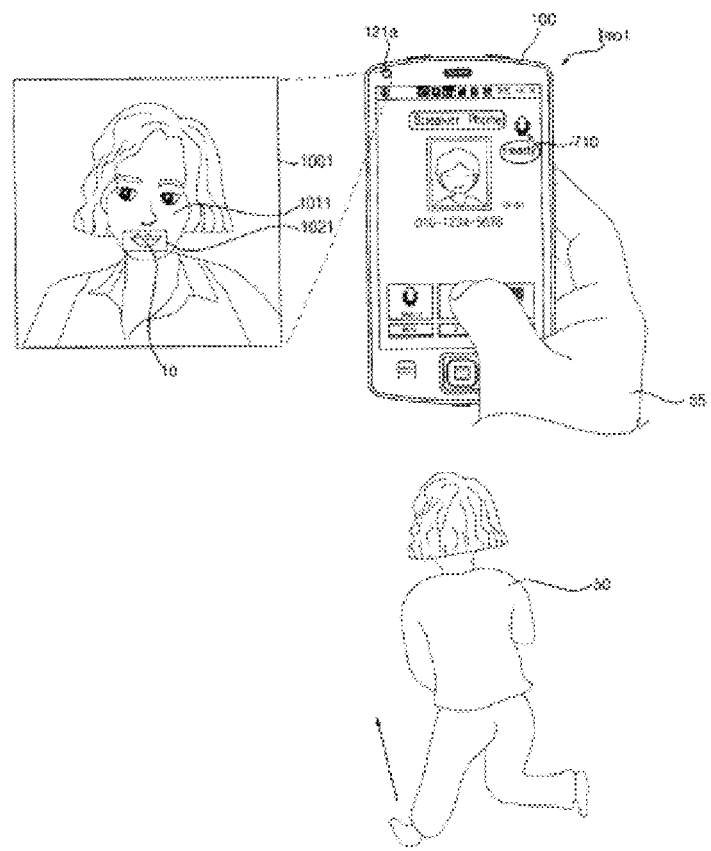

FIG. 10B illustrates the case in which the mobile terminal is operated in a speaker mode during a walking mode. As described above, an audio beam may be formed based on the image 100 captured by the camera 121a and motion information Imot from the motion sensor 145, as illustrated in FIG. 10D.

Figure 10C:
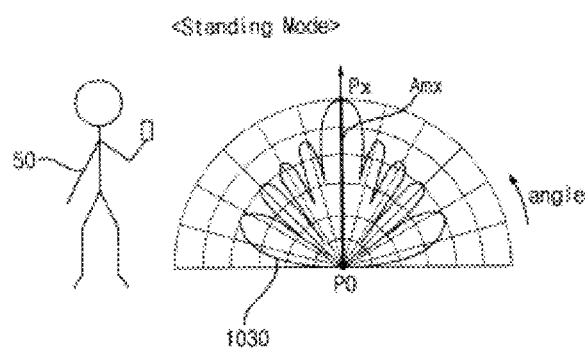
Figure 10D:
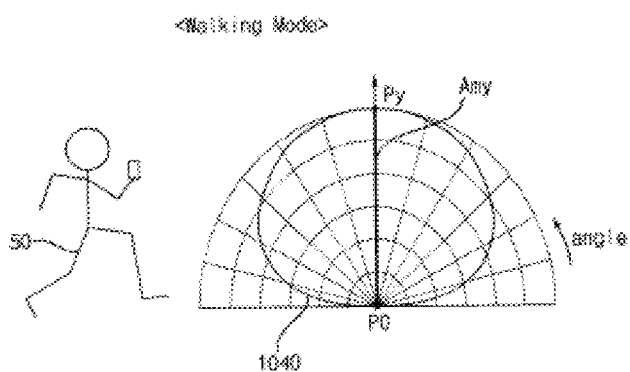

Comparing an audio beam 1030 of FIG. 10C and an audio beam 1040 of FIG. 10Dd, it may be seen that a bandwidth of an audio beam during a walking mode is greater. That is, it may be seen that the audio beam 1040 of FIG. 1 OD has constant magnitude at almost angles. As seen from FIG. 10C, an audio beam has magnitude of a predetermined value or more at a specific angle. A maximum magnitude Amy value of an audio beam during a walking mode may be greater than a maximum magnitude Amx value of an audio beam during a standing mode. During the walking mode, it is more difficult to collect audio, and thus magnitude may be set to be greater.

Figure 11A:
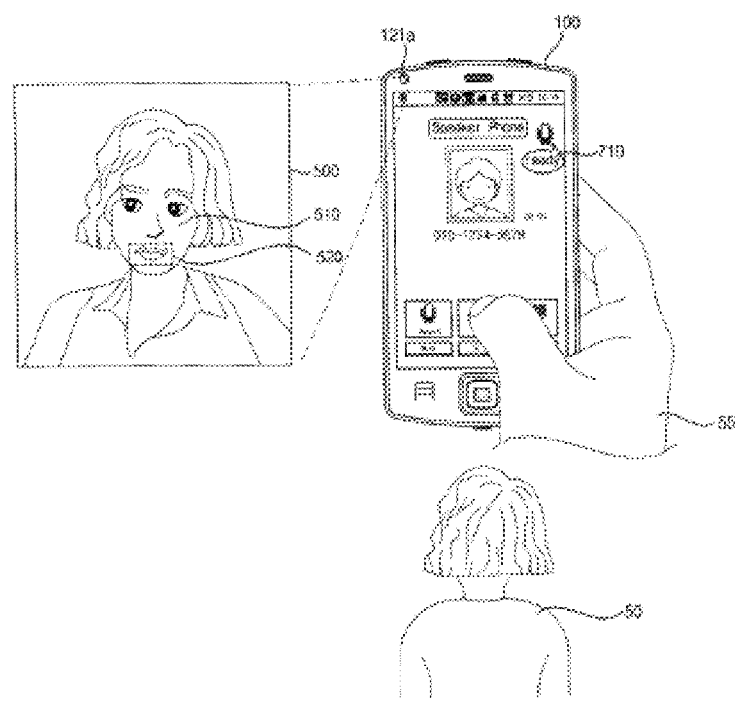
Figure 11B:
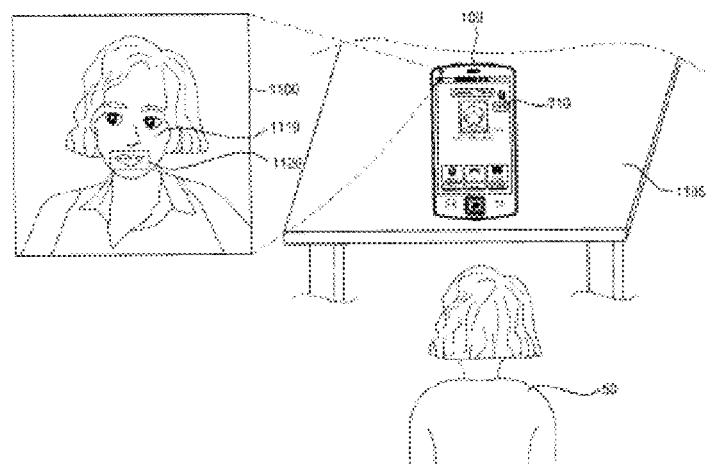

FIGS. 11A to 11B are diagram for comparing and explaining the case in which a speaker holds a mobile terminal and the case in which the mobile terminal is put on a table.

Both in the case in which the speaker 50 holds the mobile terminal 100 with a hand 55 and calls in a speaker mode, as illustrated in FIG. 11A, and in the case in which the speaker 50 calls in a speaker mode while putting the mobile terminal 100 on a table 1105, as illustrated in FIG. 11B, an audio beam may be formed based on photograph images 500 and 1100 using a camera. When the mobile terminal 100 includes a grip sensor (not shown), the mobile terminal 100 may detect grip information and form the audio beam based on the detected grip information and a captured image. In the case of FIG. 11A, the mobile terminal 100 may slightly shake, and thus a bandwidth of an audio beam may be wider than in the case of FIG. 11B. That is, the bandwidth of the audio beam in FIG. 11B may be smaller than the bandwidth exemplified in FIG. 10C.

FIGS. 12A to 12F are diagrams for explanation of formation of an audio beam when there is a plurality of speakers.

Figure 12A:
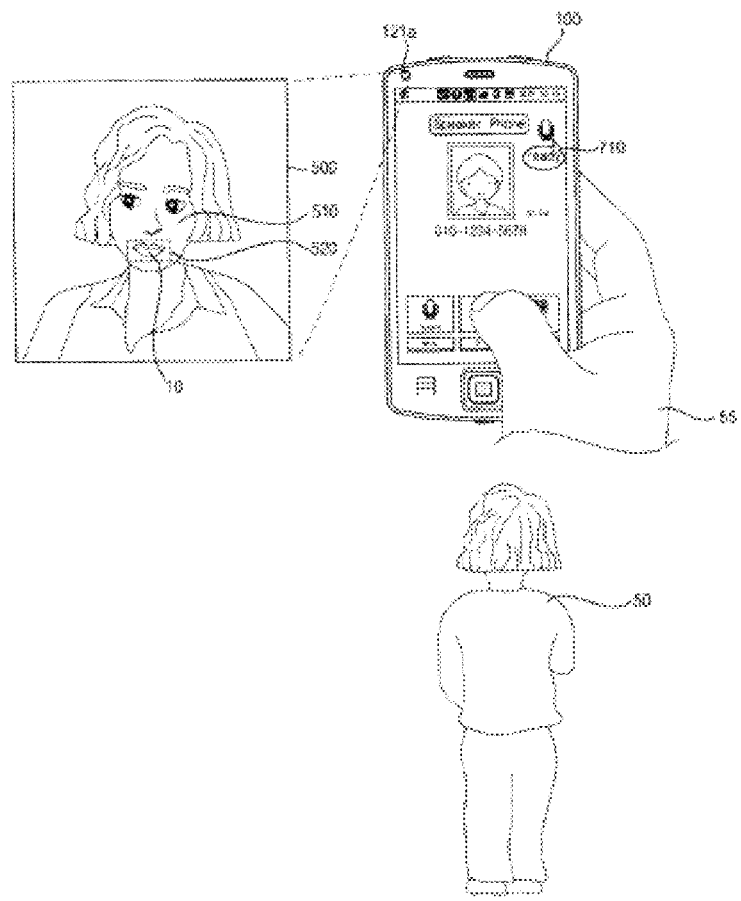

FIG. 12A illustrates the case in which an audio beam is completely formed around one speaker 50 when one speaker 50 calls in a speaker mode with the mobile terminal 100, as illustrated in FIG. 10A. The mobile terminal 100 may display the object 710 indicating that an audio beam is completely formed. The beam processor 175 forms an audio beam based on the photograph image 500 captured by the camera 121a.

Figure 12B:
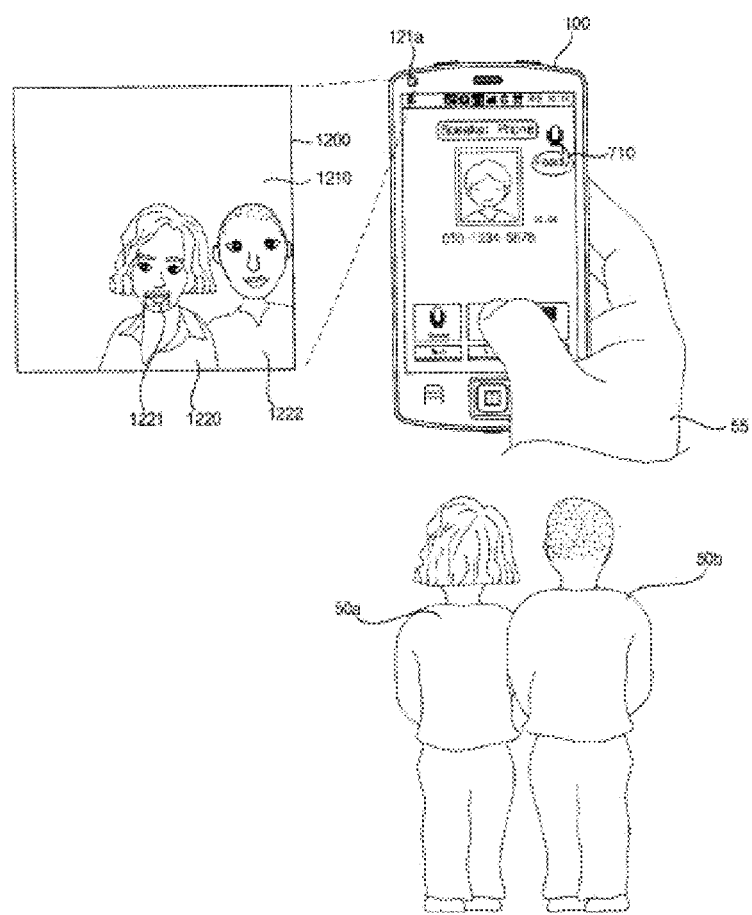

FIG. 12B illustrates the case in which an audio beam is completely formed based on any one of a plurality of speakers 50a and 50b when there is the plurality of speakers 50a and 50*b*. The mobile terminal 100 may display the object 710 indicating that an audio beam is completely formed.

The beam processor 175 forms an audio beam based on the photograph image 500 captured by the camera 121*a*. In particular, the beam processor 175 may recognize a first speaker 50*a* closer to the center of the image 500 from a plurality of speaker images 1220 and 1222 and form an audio beam based on the corresponding speaker 50*a*.

Figure 12C:
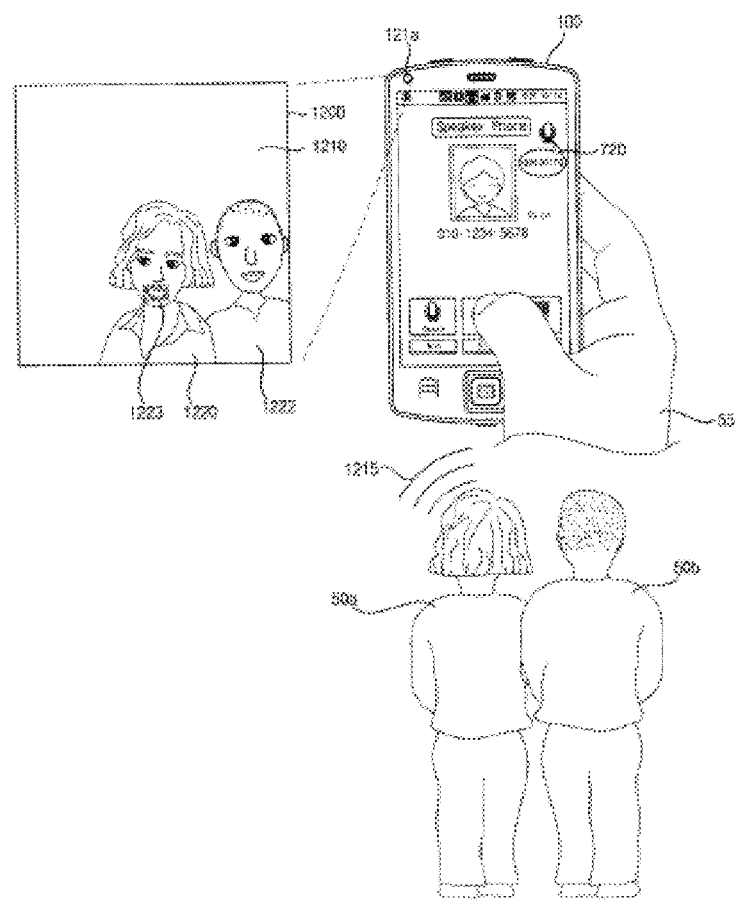

FIG. 12C illustrates the case in which the first speaker 50*a* outputs voice 1215 as an audio beam is completely formed. The beam processor 175 or the processor 180 may recognize that the first speaker 50*a* is outputting audio based on the photograph image 502 and the audio signals received from the microphones 123*a*, . . . , 123*d* and may signal-process the audio signals received from the microphones 123*a*, . . . , 123*d* according to the formed audio beam 806 (refer to FIG. 12E).

As illustrated in FIG. 12C, the processor 180 may display the object 720 indicating that audio-signal processing is performed according to the formed audio beam, on the speaker mode image 530. Accordingly, a user may recognize that an audio reception mode is normally executed.

Figure 12D:
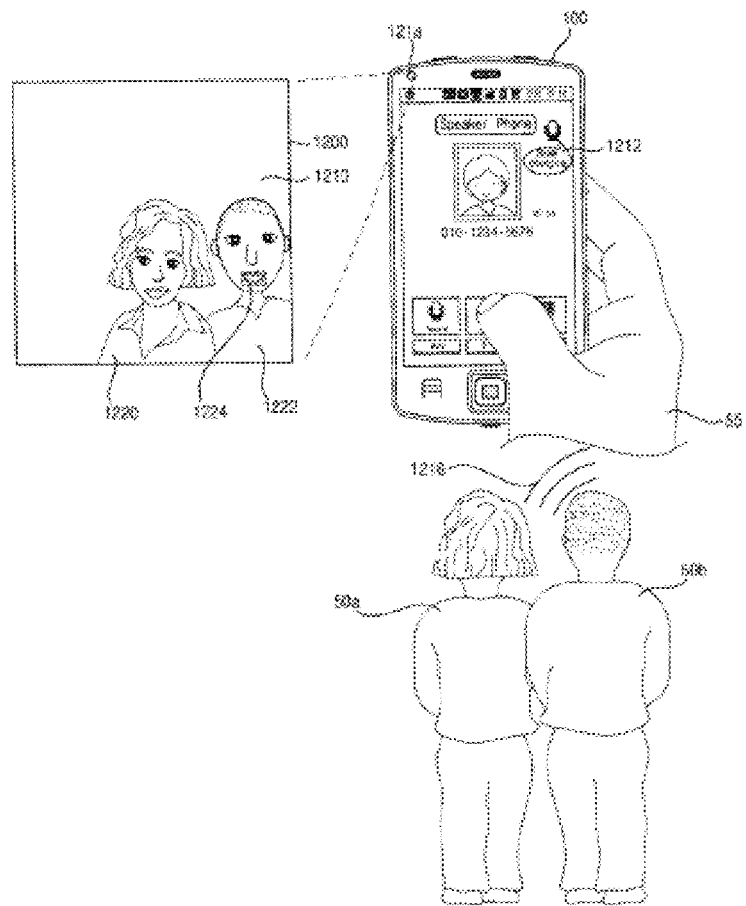

FIG. 12D illustrates that case in which a second speaker 50*b* instead of the first speaker 50*a* outputs voice 1216.

The beam processor 175 or the processor 180 may determine to reform an audio beam when a mouth 1224 in an image of the second speaker 50*b* in a photograph image 1200 is opened and when an audio signal that is not appropriate for the formed audio beam is received through the microphone 123 is received.

In addition, the processor 180 may display an object 1212 indicating that an audio beam is being varied, as illustrated in FIG. 12D.

When the second speaker 50*b* outputs the voice 1216, the beam processor 175 immediately generates the second audio beam 806 (refer to FIG. 12E) based on a position of the second speaker 50*b* in the photograph image 1200 and an audio signal originated from the voice 1216 of the second speaker 50*b*. That is, the second audio beam 806 (refer to FIG. 12E) is converted into the second audio beam 809 (refer to FIG. 12E).

Figure 12E:
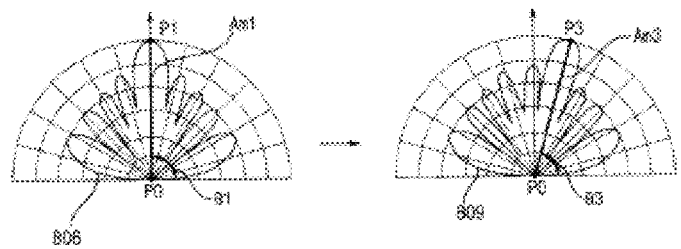

That is, since the second speaker 50*b* is positioned to the right of the first speaker 50*a*, an angle between the mobile terminal 100 and the second speaker 50*b* is 75 degrees (θ3) on the cylindrical coordinates, and the beam processor 175 of the mobile terminal 100 may form the audio beam 809, as illustrated in FIG. 12E. As seen from the diagram, magnitude Am3 at 75 degrees for audio-signal processing is highest and magnitude at other angles is gradually reduced.

Figure 12F:
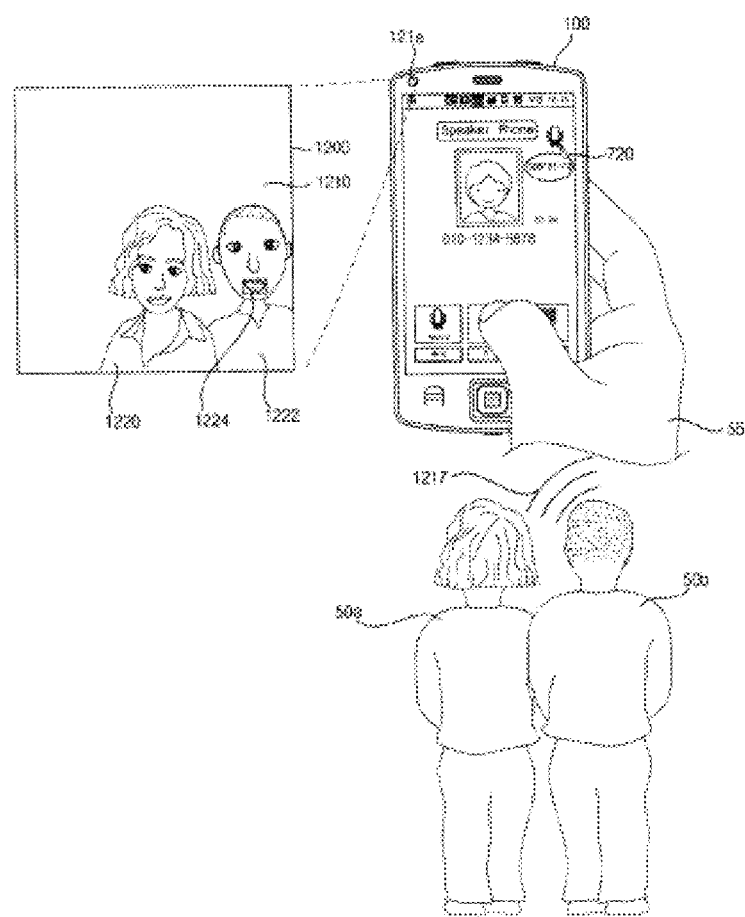

FIG. 12F illustrates the case in which the second speaker 50*b* outputs voice 1217 as the second audio beam is completely formed. The camera 121*a* may acquire the photograph image 1200 formed by photographing a plurality of speakers. In this case, the photograph image 1200 includes an image 1224 of an open mouth of a second speaker 1222.

The beam processor 175 or the processor 180 may recognize that the second speaker 50*b* outputs audio based on the photograph image 1200 and the audio signals received from the microphones 123*a*, . . . , 123*d* and may signal-process the audio signal received from the microphones 123*a*, . . . , 123*d* according to the formed audio beam 809. For example, the beam processor 175 or the processor 180 may set an audio signal received from the second microphone 123*b* with a higher gain (or magnitude) than the first microphone 123*a* among microphones disposed on the mobile terminal 100.

The beam processor 175 or the processor 180 may perform post-processing such as noise removal after signal processing according to the formed audio beam. Accordingly, an optimum audio signal may be acquired.

As illustrated in FIG. 8D, the processor 180 may display the object 720 indicating that the audio signal is processed according to the formed second audio beam, on the speaker mode image. Accordingly, a user may recognize that an audio reception mode is normally executed.

Unlike in FIG. 12B, respective audio beams may be formed with respect to a plurality of speakers based on positional information thereof. That is, the first audio beam 806 (refer to FIG. 12E) may be formed with respect to the first speaker 50*a*, the second audio beam 809 (refer to FIG. 12E) may be formed with respect to the second speaker 50*b*, and then a corresponding audio beam may be selectively applied to a speaker who outputs voice.

That is, as illustrated in FIG. 12C, when the first speaker 50*a* outputs the voice 1215, a received audio signal may be signal-processed based on the first audio beam generated for the first speaker 50*a*, based on the photograph image 1200, the received audio signal, and so on.

In addition, as illustrated in FIG. 12D or 12F, when the second speaker 50*b* outputs the voice 1216 or 1217, a received audio signal may be signal-processed based on the second audio beam generated for the second speaker 50*b*, based on the photograph image 1200, the received audio signal, and so on. This method enables prompt action and thus is advantageous to perform signal processing according to a corresponding audio beam without loss in audio signals.

FIGS. 13A to 15C illustrate another example of an audio reception mode.

The audio reception mode may include a call mode, a voice recording mode, or a voice recognition mode. In particular, the call mode may include a speaker mode. Thus far, the embodiments of the present invention have been described in terms of the speaker mode of the call mode with reference to FIGS. 7A to 12F, but other modes will be described below.

Figure 13A:
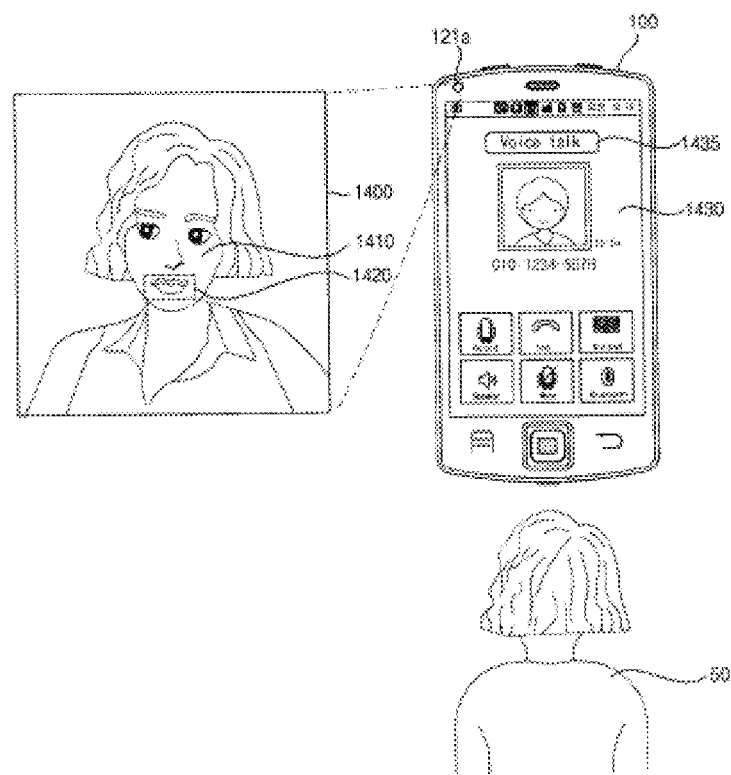

FIG. 13A illustrates a voice talk mode. In this regard, the mobile terminal 100 may display a voice talk mode image 1430 including a speaker 1435 indicating a voice talk mode. In this case, the camera 121*a* may photograph the speaker 50 and form an audio beam based on the photograph image. Although the diagram illustrates the case in which a speaker views a mobile terminal monitor, the camera 121*a* may be activated to form an audio beam based on an image of the speaker's ear when the mobile terminal is put to the speaker's ear.

Figure 13B:
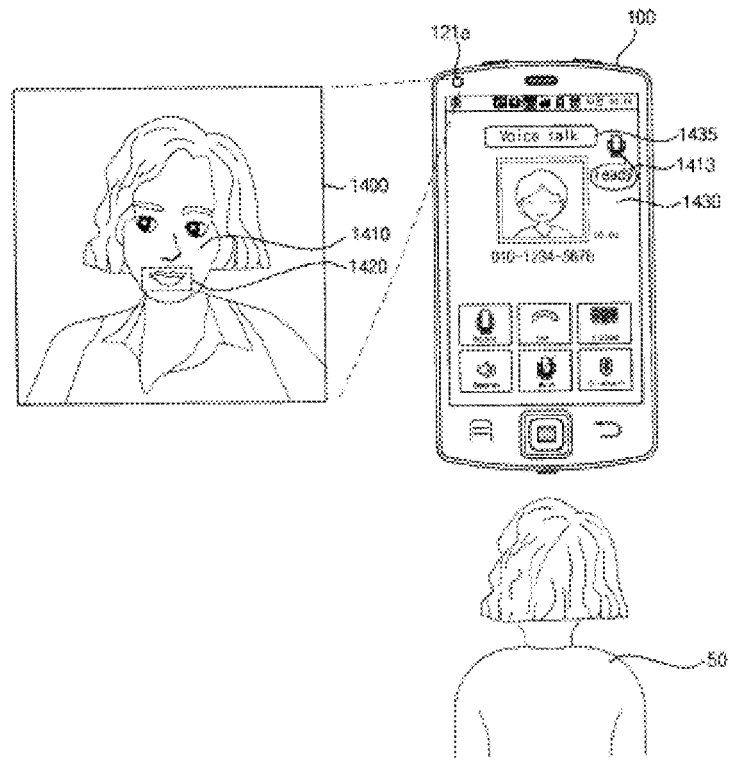

FIG. 13B illustrates the case in which an audio beam is completely formed and an object 1413 indicating that the audio beam is completely formed is displayed. Alternatively, unlike in the diagram, an audio signal such as beep sound indicating that the audio beam is completely formed may be output.

Figure 13C:
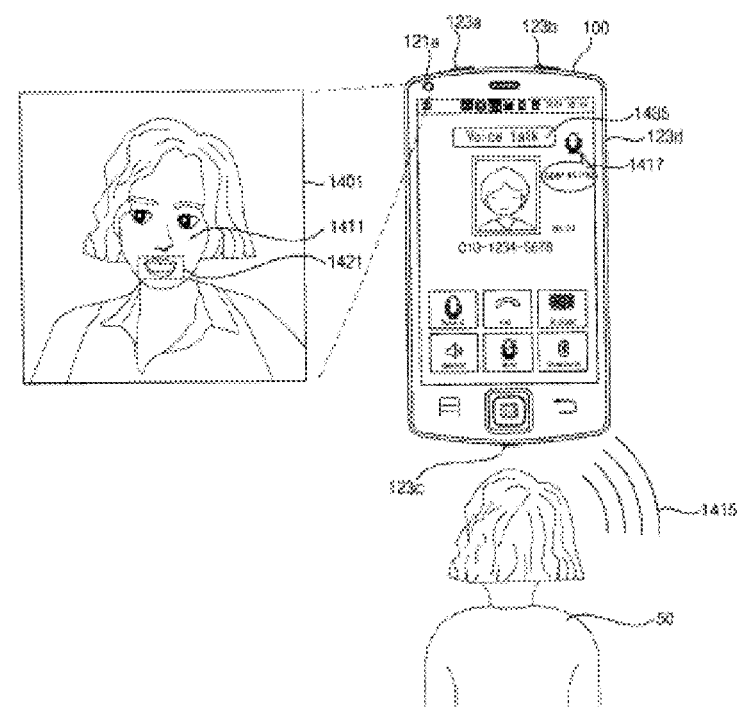

FIG. 13C illustrates the case in which the speaker 50 outputs voice 1425 as an audio beam is completely formed. In this case, the beam processor 175 or the processor 180 may signal-process the audio signals received from the microphones 123*a*, . . . , 123*d* according to the formed audio beam. The mobile terminal 100 may display an object 1417 indicating that audio-signal processing is performed according to the formed audio beam. Alternatively, unlike in the diagram, an audio signal such as beep sound indicating that audio-signal processing is normally performed. The camera 121*a* may continuously acquire a photograph image 1401 formed by photographing a speaker. In this case, the photograph image 1401 may include an image 1421 of an open mouth of a speaker image 1411.

Figure 14A:
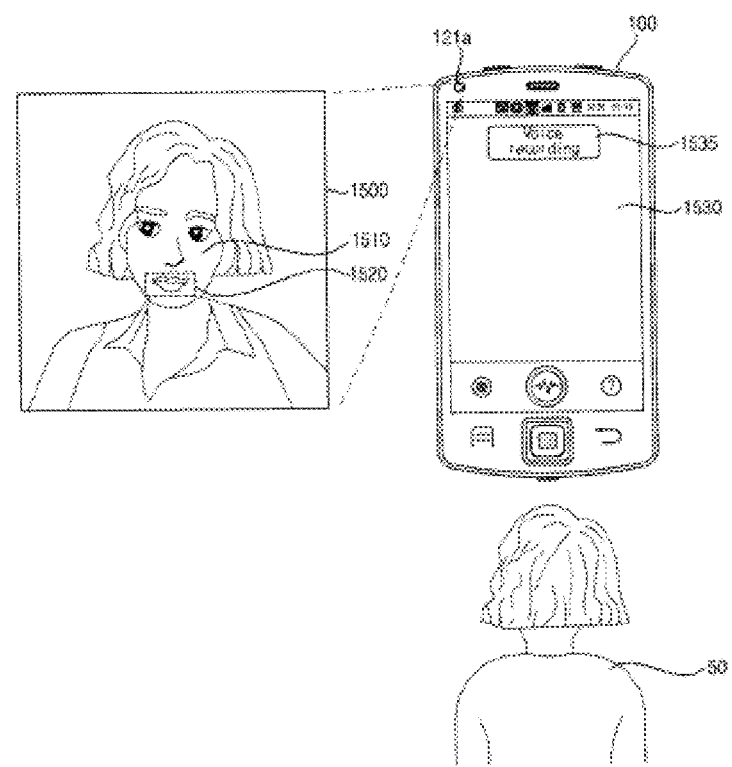

FIG. 14A illustrates a voice recording mode. In this regard, the mobile terminal 100 may display a voice recording mode image 1530 including an object 1535 indicating a voice recording mode. In this case, the camera 121a may photograph the speaker 50 and form an audio beam based on the photograph image.

Figure 14B:
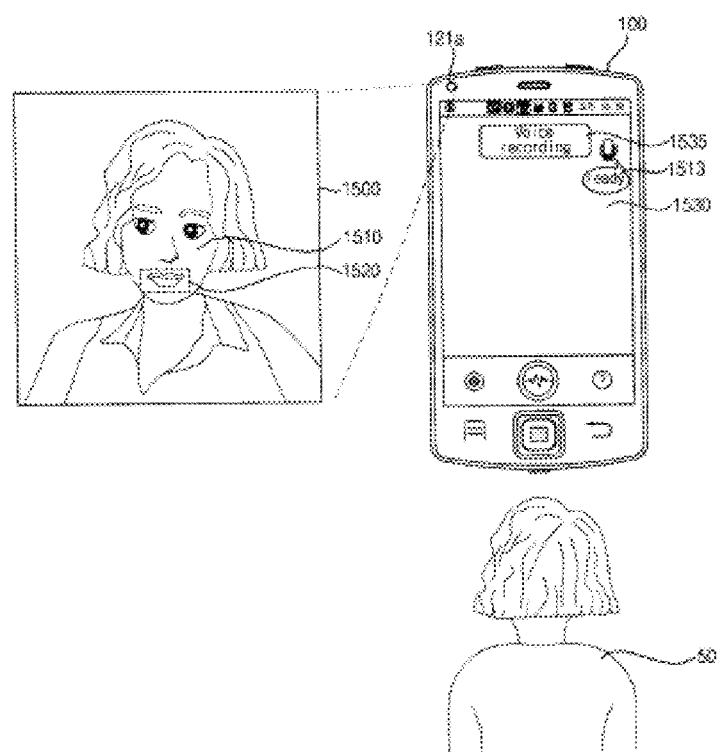

FIG. 14B illustrates the case in which an audio beam is completely formed and an object 1513 indicating that the audio beam is completely formed is displayed.

Figure 14C:
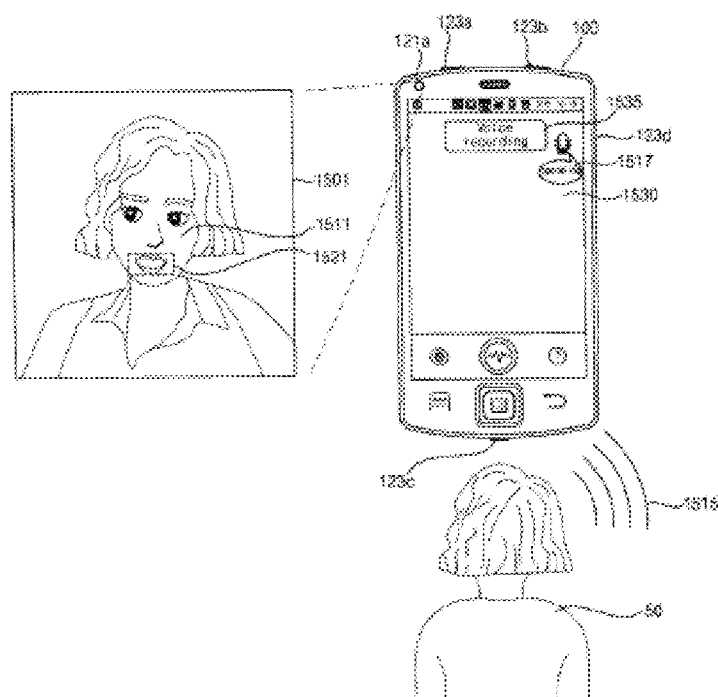

FIG. 14C illustrates the case in which the speaker 50 outputs voice 1515 as the audio beam is completely formed. In this case, the beam processor 175 or the processor 180 may signal-process the audio signal received from the microphones 123a, . . . , 123d according to the formed audio beam. The mobile terminal 100 may display an object 1517 indicating that audio-signal processing is performed according to the formed audio beam. The camera 121a may continuously acquire a photograph image 1501. In this case, the photograph image 1501 may include an image 1521 of an open mouth of a speaker image 1511.

Figure 15A:
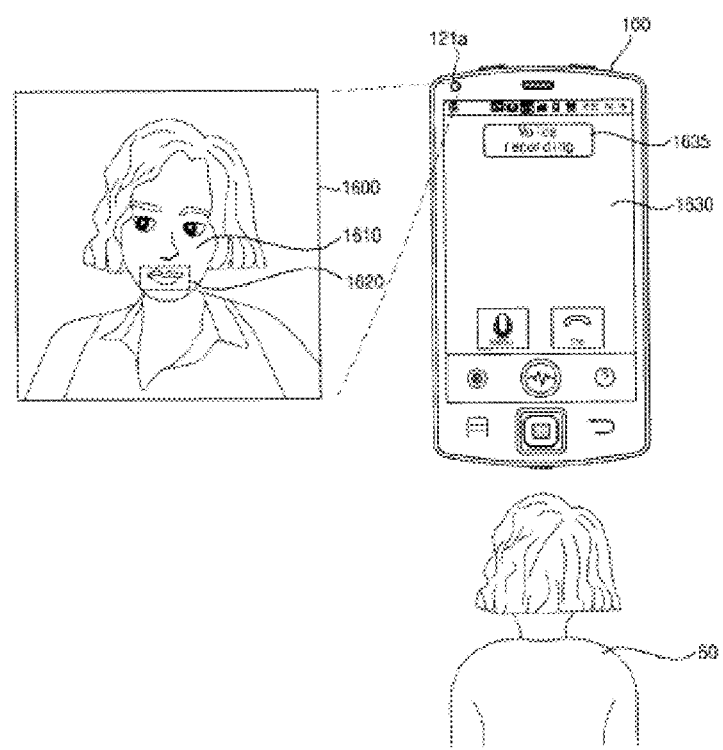

FIG. 15A illustrates a voice recognition mode. In this regard, the mobile terminal 100 may display a voice recognition mode image 1630 including an object 1635 indicating the voice recognition mode. In this case, the camera 121a may photograph the speaker 50 and form an audio beam based on the photograph image.

Figure 15B:
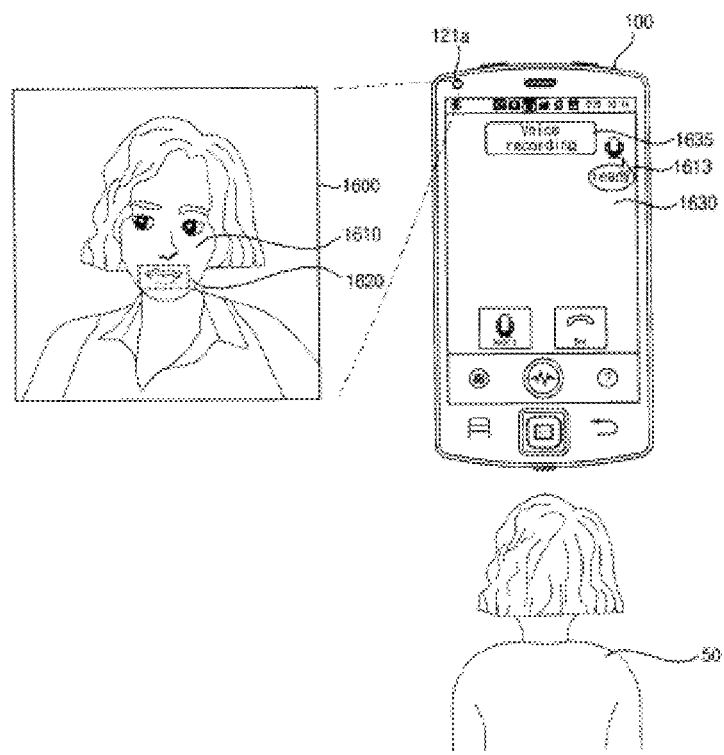

FIG. 15B illustrates the case in which an audio beam is completely formed and an object 1613 indicating that the audio beam is completely formed is displayed.

Figure 15C:
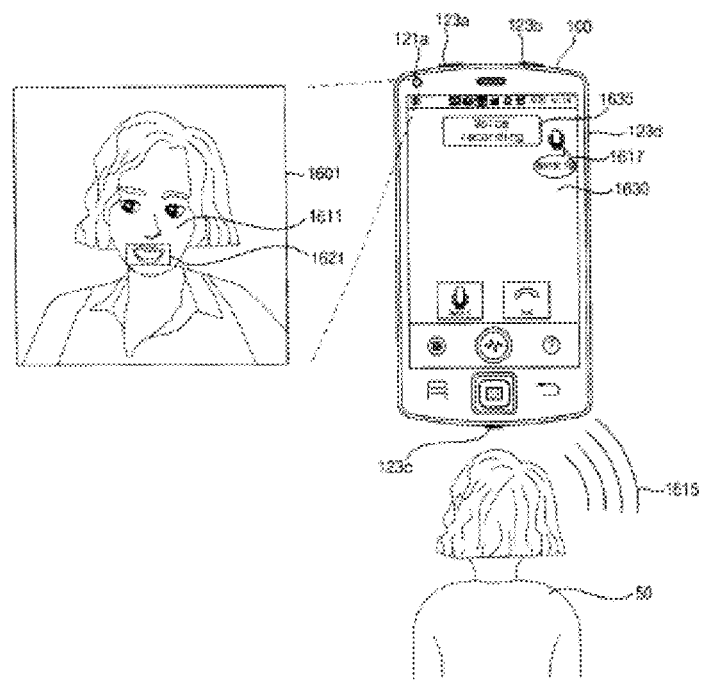

FIG. 15C illustrates the case in which the speaker 50 outputs voice 1615 as the audio beam is completely formed. In this case, the beam processor 175 or the processor 180 may signal-process the audio signals received from the microphones 123a, . . . , 123d according to the formed audio beam. The mobile terminal 100 may display an object 1617 indicating that audio-signal processing is performed according to the formed audio beam. The camera 121a may continuously acquire a photograph image 1601 formed by photographing a speaker. In this case, the photograph image 1601 may include an image 1621 of an open mouth of a speaker image 1611.

The cases in which a speaker moves, a mobile terminal moves, there are a plurality of speakers, and the like, which have been described with reference to FIGS. 7A to 12F, may also be applied to in the same or similar way to a voice talk mode, a voice recording mode, or a voice recognition mode of an audio reception mode.

The mobile terminal and an operation method thereof according to the present specification are not limited to the configurations and methods of the above-described embodiments. That is, the above-described embodiments may be partially or wholly combined to make various modifications.

For example, the audio beam forming method according to an embodiment of the present invention may be applied to an image display apparatus, in particular, a television (TV) or the like. A TV including a camera may form an audio beam corresponding to a position of a speaker based on a photograph image from the camera. Alternatively, the TV may form an audio beam corresponding to a position of a speaker based on a photograph image from the camera and a speaker voice signal received from a microphone included in the TV. Alternatively, a remote controller for remotely controlling the TV may form an audio beam corresponding to a position of a speaker based on an audio signal from a microphone included in the remote controller and motion information from a motion sensor included in the remote controller. Alternatively, the TV or the remote controller may form an audio beam corresponding to a position of a speaker based on a photograph image from the camera and a speaker voice signal received from the microphone included in the TV.

An operating method of a mobile terminal according to the present invention can also be embodied as processor readable codes on a processor readable recording medium. The processor readable recording medium is any data storage device that can store data which can be thereafter read by a processor. Examples of the processor readable recording medium include read-only memory (ROM), random-access memory (RAM), a compact disk (CD)-ROM, magnetic tapes, floppy disks, optical data storage devices, carrier wave such as transmission via the Internet, etc. The processor readable recording medium can also be distributed over network coupled computer systems so that the processor readable code is stored and executed in a distributed fashion.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An operating method of a mobile terminal comprising a camera, a motion sensor, and a plurality of microphones, the method comprising:
   forming an audio beam for collecting an audio signal from a speaker based on at least one of a photograph image from the camera and motion information from the motion sensor;
   receiving the audio signal from the speaker through the plurality of microphones;
   signal-processing the received audio signal based on the formed audio beam.

2. The method according to claim 1, further comprising:
   entering an audio reception mode; and
   upon entering the audio reception mode, activating the camera, the motion sensor, and the plurality of microphones.

3. The method according to claim 1, wherein the forming of the audio beam comprises forming the audio beam to correspond to a position of a mouth of the speaker in an image formed by photographing the speaker, in an audio input mode.

4. The method according to claim 1, further comprising determining a position of the speaker based on at least one of the photograph image from the camera and the motion information from the motion sensor,
   wherein the forming of the audio beam comprises forming the audio beam to correspond to the position of the speaker.

5. The method according to claim 1, further comprising, when the speaker moves after the audio beam is formed, updating the audio beam for collecting the audio signal from the speaker based on an image formed by photographing a moving speaker.

6. The method according to claim 1, further comprising, when the speaker moves after the audio beam is formed and the audio signal is received, updating the audio beam for collecting the audio signal from the speaker based on an image formed by photographing the moving speaker and the received audio signal.

7. The method according to claim 1, further comprising, when the mobile terminal moves after the audio beam is formed, updating the audio beam for collecting the audio signal from the speaker based on an image formed by photographing a moving speaker and motion information of the mobile terminal from the motion sensor.

8. The method according to claim 1, further comprising, when the mobile terminal moves after the audio beam is formed and the audio signal is received, updating the audio beam for collecting the audio signal from the speaker based on an image formed by photographing a moving speaker, motion information of the mobile terminal from the motion sensor, and the received audio signal.

9. The method according to claim 1, wherein the forming of the audio beam comprises, when the photograph image comprises a plurality of speakers, forming the audio beam to correspond to a speaker closer to a center of the photograph image.

10. The method according to claim 1, wherein the forming of the audio beam comprises, when the photograph image comprises a plurality of speakers, forming a plurality of audio beams corresponding to respective positions of the speakers and activating an audio beam corresponding to a speaker who moves his or her mouth among the plurality of speakers, among the plurality of audio beams.

11. The method according to claim 1, further comprising, upon receiving an audio signal from another speaker other than the speaker after the audio beam is formed, forming a second audio beam based on the photograph image from the camera and the audio signal from the another speaker.

12. The method according to claim 1, further comprising, when the speaker moves, updating an audio beam according to movement of the speaker,
wherein a bandwidth of the audio beam when the speaker moves is greater than a bandwidth of the audio beam when the speaker stops.

13. An operating method of a mobile terminal comprising a camera, a motion sensor, and a plurality of microphones, the method comprising:
entering an audio reception mode;
activating the camera, the motion sensor, the plurality of microphones;
forming an audio beam for collecting an audio signal from a speaker based on at least one of a photograph image from the camera and motion information from the motion sensor; and
upon completely forming the audio beam, displaying an object indicating that the audio beam is completely formed.

14. A mobile terminal comprising:
a camera;
a motion sensor for detecting motion information of the mobile terminal;
a plurality of microphones for collecting an audio signal; and
a beam processor for determining a position of a speaker based on at least one of a photograph image from the camera and motion information from the motion sensor, forming an audio beam for collecting an audio signal from the speaker to correspond to the position of the speaker, and signal-processing the audio signal received through the plurality of microphones based on the formed audio beam; and
a display for, upon completely forming the audio beam, displaying an object indicating that the audio beam is completely formed.

15. The mobile terminal according to claim 14, further comprising a processor for, upon entering an audio reception mode, activating the camera, the motion sensor, and the plurality of microphones.

16. The mobile terminal according to claim 14, wherein, when the speaker moves after the audio beam is formed and the audio signal is received, the beam processor updates the audio beam for collecting the audio signal from the speaker based on an image formed by photographing the moving speaker and the received audio signal.

17. The mobile terminal according to claim 14, wherein, when the mobile terminal moves after the audio beam is formed and the audio signal is received, the beam processor updates the audio beam for collecting the audio signal from the speaker based on an image formed by photographing a moving speaker, motion information of the mobile terminal from the motion sensor, and the received audio signal.

18. The mobile terminal according to claim 14, wherein, upon receiving an audio signal from another speaker other than the speaker after the audio beam is formed, the beam processor forms a second audio beam based on the photograph image from the camera and the audio signal from the another speaker.

* * * * *